United States Patent [19]

Evans

[11] Patent Number: 5,868,105
[45] Date of Patent: Feb. 9, 1999

[54] ENGINE COOLING SYSTEM WITH TEMPERATURE-CONTROLLED EXPANSION CHAMBER FOR MAINTAINING A SUBSTANTIALLY ANHYDROUS COOLANT, AND RELATED METHOD OF COOLING

[75] Inventor: John W. Evans, Sharon, Conn.

[73] Assignee: Evans Cooling Systems, Inc., Sharon, Conn.

[21] Appl. No.: 872,846

[22] Filed: Jun. 11, 1997

[51] Int. Cl.$^6$ .................................................. F01P 7/02
[52] U.S. Cl. ................. 123/41.5; 123/41.42; 123/41.51; 123/41.54
[58] Field of Search ............... 123/41.5, 41.51, 123/41.54, 41.47

[56] References Cited

U.S. PATENT DOCUMENTS

| | | | |
|---|---|---|---|
| 2,998,068 | 6/1961 | Waydak | 123/41.1 |
| 3,238,932 | 3/1966 | Simpson | 123/41.5 |
| 3,499,481 | 3/1970 | Avrea | 165/11 |
| 4,006,775 | 2/1977 | Avrea | 165/51 |
| 4,461,342 | 7/1984 | Avrea | 165/104 |
| 4,550,694 | 11/1985 | Evans | 123/41.02 |
| 4,630,572 | 12/1986 | Evans | 123/41.21 |
| 5,031,579 | 7/1991 | Evans | 123/41.2 |
| 5,044,430 | 9/1991 | Avrea | 165/104.32 |
| 5,172,657 | 12/1992 | Sausner | 123/41.21 |
| 5,255,636 | 10/1993 | Evans | 123/41.54 |
| 5,317,994 | 6/1994 | Evans | 123/41.1 |
| 5,353,751 | 10/1994 | Evans | 123/41.01 |
| 5,381,762 | 1/1995 | Evans | 123/41.54 |
| 5,385,123 | 1/1995 | Evans | 123/41.21 |
| 5,419,287 | 5/1995 | Evans | 123/41.29 |

FOREIGN PATENT DOCUMENTS 3143749  4/1981  Germany .

OTHER PUBLICATIONS

Chrysler Corporation, *Cooling System Service Manual for the 1996 New Yorker, LHS, Concorde, Intrepid and Vision*, pp. 7–1 through 7–4, 7–21 and 7–21, 1995.

Ford Motor Corporation, *Owner's Guide for Mercury Sable* "Engine Oil/Engine Cooling System", p. 150, 1986.

Ford Motor Corporation, *Service Manual for the Lincoln Town Car, Crown Victoria/Grand Marquis*, pp. 03–03–1 through 03–03–7, 1992.

Ford Motor Corporation, *Taurus/Sable Shop Manual* "Cooling System Group 27".

Product literature from Opti–Cap, Inc., entitled "A Typical Installation Looks Like This When Completed", regarding the OPTI–CAP®, 7 pages.

U.S. application No. 08/409,026, of John W. Evans, filed on Mar. 23, 1995, for Non–Aqueous Heat Transfer Fluid and use Thereof.

U.S. application No. 08/747,634 of John W. Evans, filed on Nov. 13, 1996, for Hermetically–Sealed Engine Cooling System and Related Method of Cooling.

*Primary Examiner*—John T. Kwon
*Attorney, Agent, or Firm*—Cummings & Lockwood

[57] ABSTRACT

In an engine cooling system, an upper coolant chamber and a lower coolant chamber of a typical engine, such as an internal combustion engine or fuel cell, are formed adjacent to the heat-emitting components of the engine, and a substantially anhydrous, boilable liquid coolant having a saturation temperature higher than that of water is received within the engine coolant chambers. A coolant expansion reservoir defining an expansion chamber is coupled in fluid communication between the engine coolant chambers and the engine's ambient atmosphere for receiving coolant from the engine coolant chambers and permitting coolant flow between the expansion chamber and engine coolant chambers with thermal expansion and contraction of the coolant. The expansion reservoir is mounted within a desorption environment formed within the vehicle's engine bay on the exhaust side of the radiator for heating the coolant within the expansion chamber to a temperature at or above a predetermined temperature during a substantial period of engine operation in order to vaporize substantially all water from the coolant and thereby maintain the coolant in a substantially anhydrous state.

30 Claims, 7 Drawing Sheets

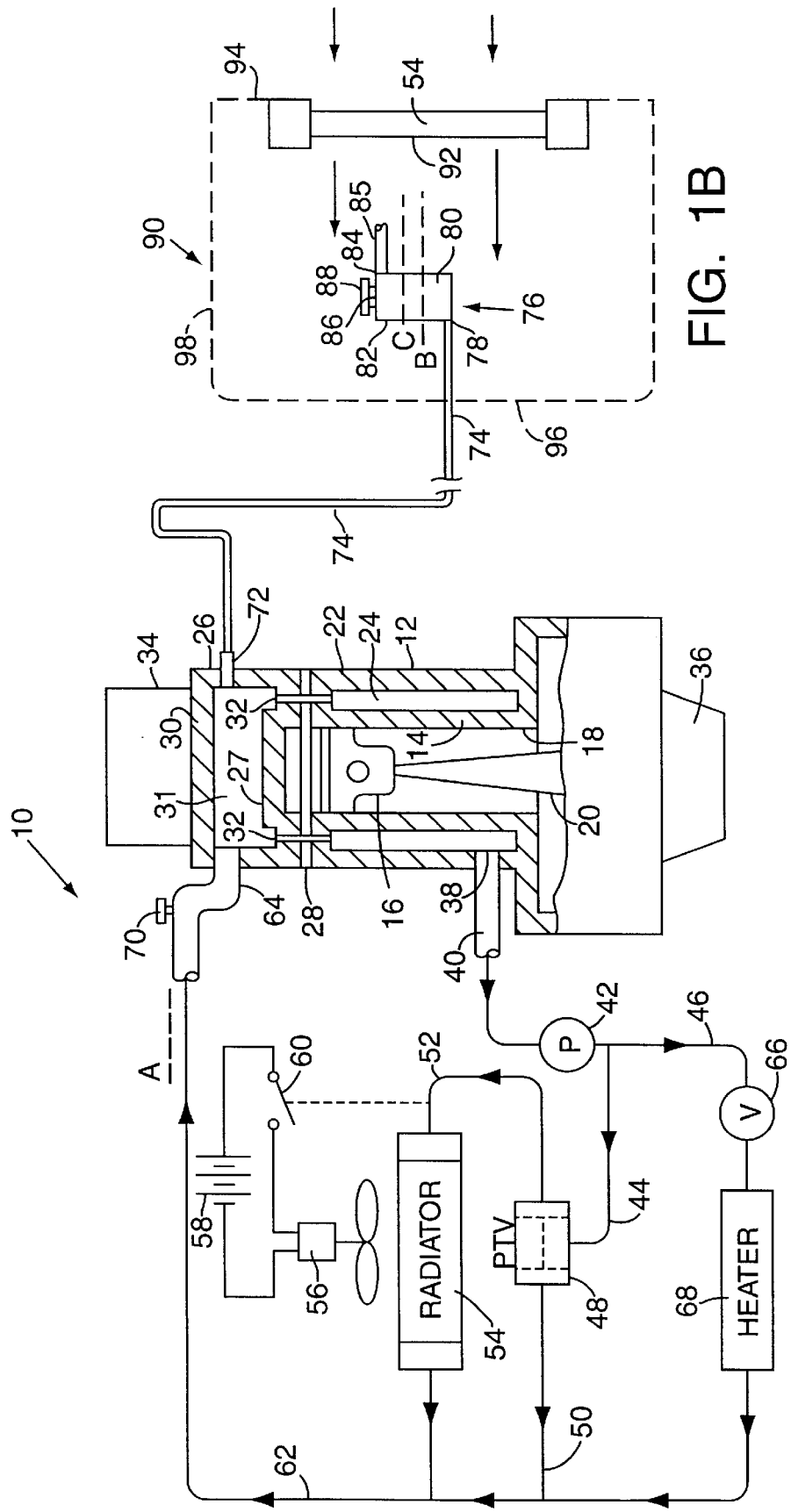

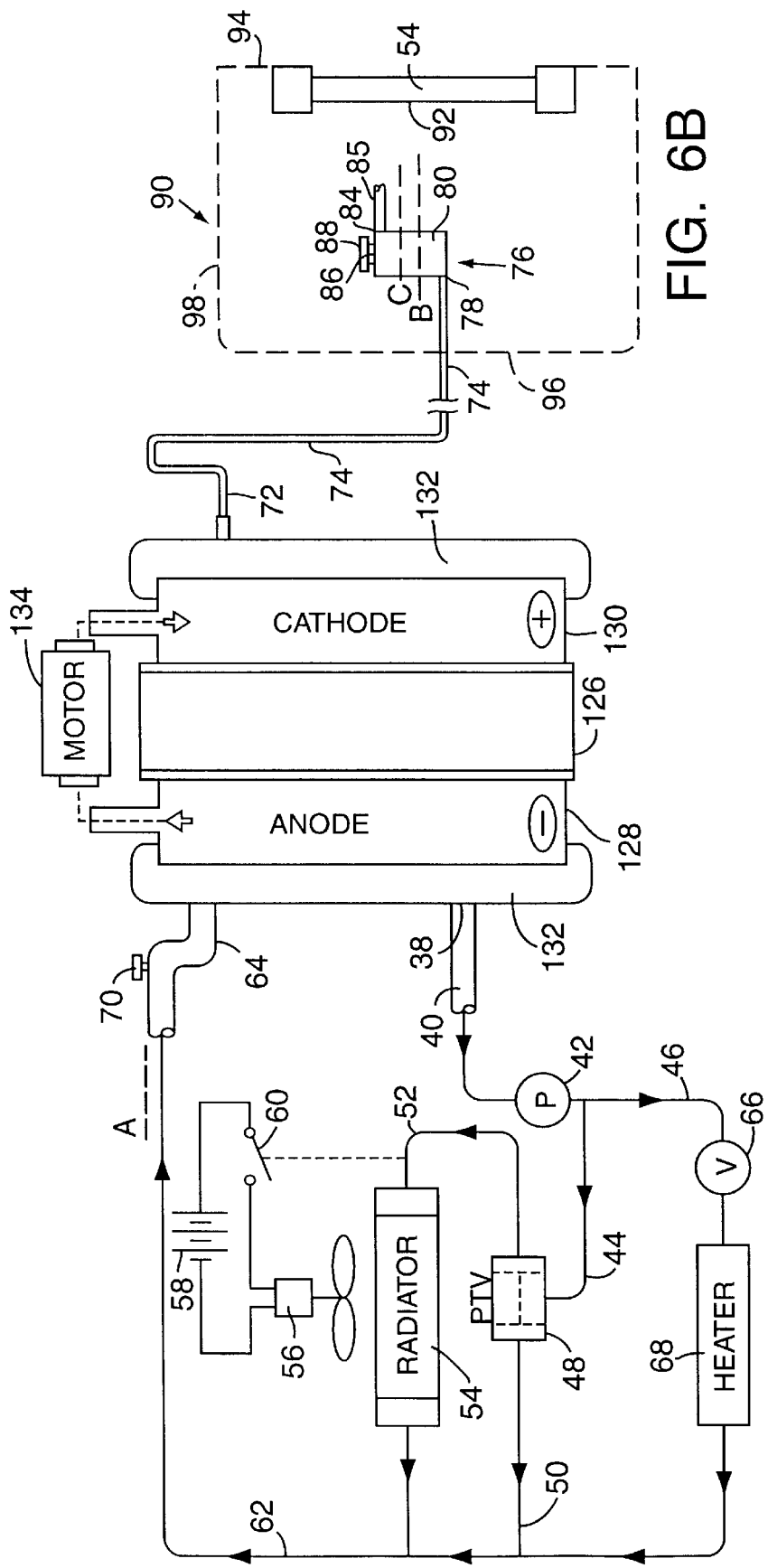

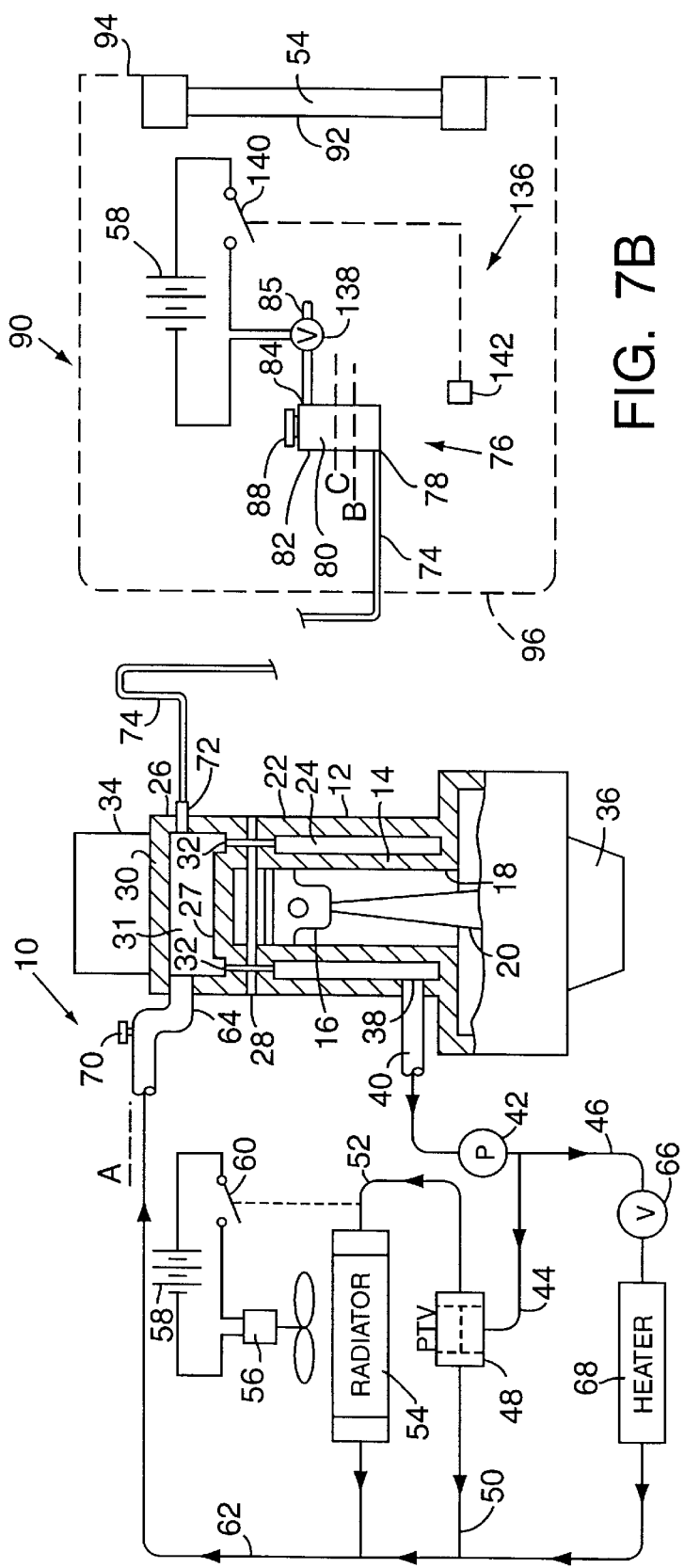
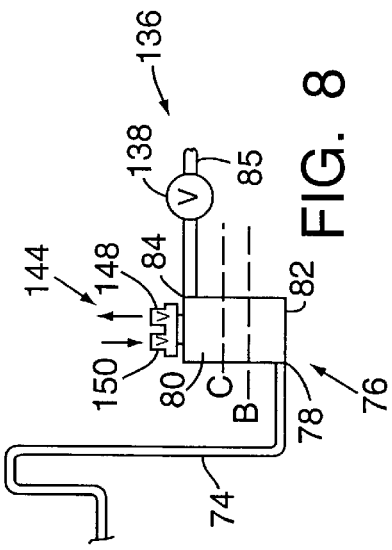
FIG. 7A
FIG. 7B
FIG. 8

ENGINE COOLING SYSTEM WITH TEMPERATURE-CONTROLLED EXPANSION CHAMBER FOR MAINTAINING A SUBSTANTIALLY ANHYDROUS COOLANT, AND RELATED METHOD OF COOLING

CROSS REFERENCE TO RELATED APPLICATION

This patent application contains subject matter related to my co-pending patent application Ser. No. 08/747,634, entitled "Hermetically-Sealed Engine Cooling System, And Related Method of Cooling", filed on Nov. 13, 1996, and co-pending herewith, which is hereby expressly incorporated by reference as part of the present disclosure.

FIELD OF THE INVENTION

The present invention relates generally to cooling systems for power-generating equipment or engines (for example, internal combustion engines, fuel cells and the like), such as those used in motor vehicles, construction equipment, generators and other applications, and more specifically, to a condenserless cooling system, employing a substantially anhydrous, boilable liquid coolant and a ventilated, temperature-controlled expansion chamber for receiving coolant during engine operation and maintaining the coolant at or above a predetermined temperature in order to vaporize substantially all water from the coolant and thereby maintain the coolant in a substantially anhydrous state.

BACKGROUND INFORMATION

It has long been a desire in the cooling system field to significantly extend the longevity of liquid coolants and/or cooling system components to approach or be coextensive with the lifetime of the motor vehicle or other power generating equipment with which the cooling system is used. In order to achieve this goal, it would be necessary to extend the corrosion inhibitor stability of liquid coolants to thereby limit the water content and resulting acidity within the coolants and their corrosive effects on engine surfaces and other cooling system components. An ideal such system would have to be low in water content at all times, and therefore would have to be capable of both significantly restricting the absorption of water into the coolant and forcing water out of the coolant.

U.S. Pat. No. 5,031,579, dated Jul. 16, 1991, shows a condenserless apparatus for cooling an internal combustion engine with a substantially anhydrous, boilable liquid coolant having a saturation temperature above that of water. The apparatus comprises a coolant chamber surrounding the cylinder walls and combustion chamber domes of the engine, and a coolant pump which is adapted to pump coolant through the coolant chamber at a flow rate so that the liquid coolant substantially condenses the coolant vaporized upon contact with the metal surfaces of the engine.

The apparatus of the '579 patent further comprises means for exhausting gases and/or vapors from the coolant chamber which is coupled in fluid communication with the coolant chamber at a location at or below ambient pressure. The means for exhausting preferably includes a conduit in fluid communication on one end with the coolant chamber, and an expansion tank in fluid communication with the other end of the conduit for receiving the gases and/or vapors from the coolant chamber and purging the gases through an outlet port into the ambient atmosphere. The liquid within the expansion tank is maintained at a level above the tank's connection to the conduit in order to provide a liquid barrier between the coolant chamber and the engine's ambient atmosphere.

The apparatus of the '579 patent further comprises a dehydrating unit coupled in fluid communication with an outlet port of the expansion tank for dehydrating the ambient air drawn into the expansion tank and thereby minimizing the exposure of the coolant to ambient vapors. Thus, an engine equipped with this type of apparatus can limit the amount of moisture returning to the coolant chamber by employing both the liquid barrier in the expansion tank and the dehydrating unit.

The apparatus of the '579 patent can use substantially non-aqueous coolants operating at ambient vent pressures, and therefore derives significant benefits over currently produced engine cooling systems. However, although the dehydrating unit provides significant advantages, it may be perceived in certain applications as being relatively bulky and thus undesirable. In addition, even when the engine is not running, the dehydrating unit will continue to absorb moisture, and thus requires periodic maintenance to remain effective. The preferred coolants in the apparatus of the '579 patent are forms of diols (e.g., propylene glycol) and are basically hygroscopic such that if exposed to ambient air, they will continue to absorb water vapor. If the dehydrating unit becomes saturated, it will permit moisture to pass into the expansion tank and in turn expose the coolant to undesirable levels of water. Thus, particularly at relatively low ambient temperatures (e.g., below about 10° C. or 50° F.), the liquid barrier in the expansion tank will not prevent the introduction of water vapor into the engine coolant chambers, but rather will absorb water.

The introduction of water into the coolant causes an increasing rate of degradation of the coolant, with the production of acids (oxsolic, acetic, etc.) and thus significantly limits the effective useful life of the coolant additives. This is discussed in further detail in my co-pending patent application Ser. No. 08/449,338, entitled "A Method Of Cooling A Heat Exchange System Using A Non-Aqueous Heat Transfer Fluid", which is hereby expressly incorporated by reference as part of the present disclosure.

Accordingly, it is an object of the present invention to overcome the drawbacks and disadvantages of the above-described cooling systems for internal combustion engines and other power generating equipment.

SUMMARY OF THE INVENTION

The present invention is directed to an engine cooling system, and related method of cooling wherein at least one engine coolant chamber is formed adjacent to heat-emitting components of the engine, and a substantially anhydrous, boilable liquid coolant having a saturation temperature higher than that of water is received within the engine coolant chamber. A coolant expansion reservoir defining an expansion chamber is coupled in fluid communication between the at least one engine coolant chamber and the engine's ambient atmosphere for receiving coolant from the engine coolant chamber and permitting coolant flow between the expansion chamber and engine coolant chamber with thermal expansion and contraction of the coolant. Means are also provided for heating the coolant within the expansion chamber to a temperature at or above a predetermined temperature during a substantial period of engine operation in order to vaporize substantially all water from the coolant and thereby maintain the coolant in a substantially anhydrous state.

In a preferred embodiment of the invention, the coolant is propylene glycol, and the predetermined temperature of the coolant within the expansion chamber is at least approximately 70° F. (21.1° C.), and is preferably at least approximately 90° F. (32.2° C.), in order to maintain the water content of the coolant at a level of less than approximately 5% water (by weight), and preferably less than approximately 3% water (by weight). Also in a preferred embodiment, the expansion reservoir is located within a desorption environment of the vehicle, which may be formed, for example, within the engine bay on the exhaust side of the radiator, in order to heat the reservoir with the relatively warm air surrounding the engine and/or discharged by the radiator during engine operation.

In several alternative embodiments of the invention, the expansion reservoir includes an auxiliary heating circuit for heating the coolant within the expansion chamber to a temperature at or above the predetermined temperature. The auxiliary heating circuit may take the form of one or more electrical coils immersed within, located adjacent to, and/or surrounding the coolant in the expansion chamber, or a liquid-to-liquid heat exchange assembly immersed within and/or surrounding the coolant in the expansion chamber. The liquid-to-liquid heat exchange assembly preferably receives relatively hot coolant discharged from the engine coolant chambers and transfers heat from the hot coolant to the expansion chamber in order to heat the coolant in the expansion chamber to a temperature at or above the predetermined temperature.

The expansion reservoir of the invention may also include a ventilation valve for selectively ventilating the expansion chamber to the engine's ambient atmosphere. In a preferred embodiment, the ventilation valve is temperature controlled and set to ventilate the expansion chamber when the temperature of the coolant in the expansion chamber and/or the temperature of its immediate environment reaches the predetermined temperature value. When the measured temperature is below the predetermined temperature, such as during engine shut down, the temperature-controlled valve is closed in order to seal the expansion chamber and thereby prevent ambient moisture from being drawn in and hygroscopically absorbed into the coolant. In another embodiment of the invention, the ventilation valve may take the form of a pressure-relief valve and/or vacuum-relief valve set to ventilate the reservoir when the pressure within the expansion chamber exceeds a predetermined upper pressure limit or drops below a predetermined lower pressure limit, respectively.

One advantage of the apparatus and method of the present invention is that the coolant may be substantially continuously maintained in an approximately anhydrous state, thus preventing the production of acids that would otherwise degrade the coolant, and in turn avoid an elevated water content which would negatively affect the saturation temperature and nucleate boiling point of the coolant, and significantly reduce the effective lives of the coolant and cooling system components. Accordingly, the cooling system of the invention may be employed to significantly increase the useful lives of the anhydrous coolant and cooling system components without the need for a desiccant-filled canister or like dehydrating unit as disclosed in U.S. Pat. No. 5,031,579.

Other advantages of the present invention will become apparent in view of the following detailed description and accompanying drawings.

BRIEF DESCRIPTION OF THE DRAWINGS

FIGS. 1A and 1B are schematic, partial cross-sectional views of a first embodiment of an engine cooling system of the present invention comprising a ventilated, temperature-controlled expansion reservoir for maintaining the coolant at or above a predetermined temperature in order to vaporize substantially all water from the coolant and thereby maintain the coolant in a substantially anhydrous state.

FIGS. 6A and 6B are schematic, partial cross-sectional views of another embodiment of an engine cooling system of the invention wherein the engine is a fuel cell.

FIGS. 7A and 7B are schematic, partial cross-sectional views of another embodiment of an engine cooling system of the invention wherein the expansion reservoir comprises a temperature-controlled ventilation valve for selectively ventilating the reservoir to the engine's ambient atmosphere.

FIG. 8 is a schematic, partial cross-sectional view of another embodiment of the expansion reservoir of the invention comprising a pressure-relief and vacuum-relief valve assembly.

DETAILED DESCRIPTION OF PREFERRED EMBODIMENTS

Figures 2A, 2B:
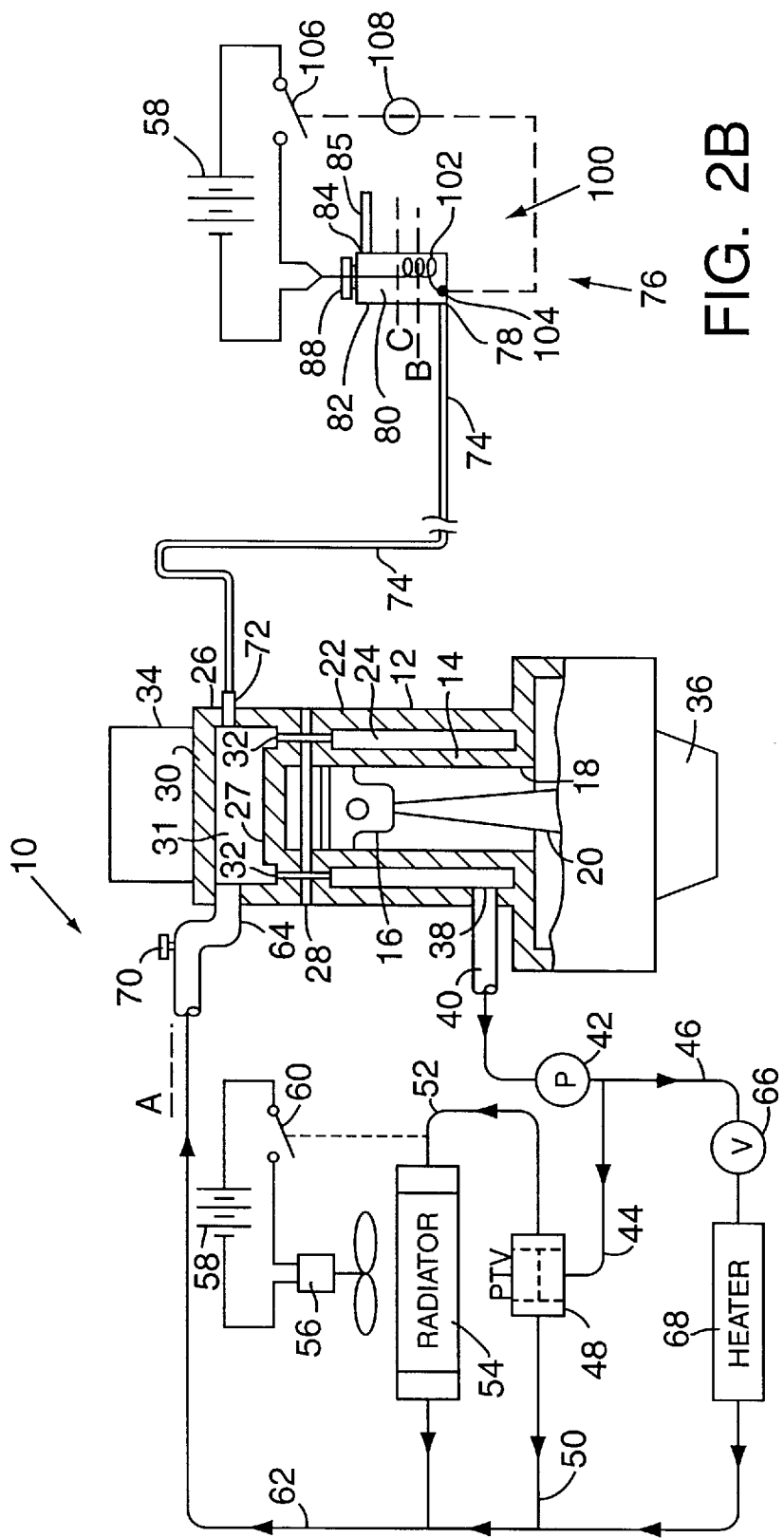
FIGS. 2A and 2B are schematic, partial cross-sectional views of another embodiment of an engine cooling system of the invention wherein the expansion reservoir includes an auxiliary electric heater for heating the coolant within the reservoir to a temperature at or above the predetermined temperature.

In FIGS. 1A and 1B, a typical internal combustion engine comprising a cooling system embodying the invention, and configured to operate in accordance with the method of the invention, is indicated generally by the reference numeral 10. Although the preferred embodiments of the present invention are described herein with reference to several known types of engines or power-generating apparatus, including internal combustion engines and fuel cells, as will be recognized by those skilled in the pertinent art, the present invention is equally applicable to numerous other types of engines or power-generating apparatus. Accordingly, unless specifically indicated otherwise, the terms "engine" and "power-generating apparatus" are used interchangeably in this specification, and each of these terms is intended to include, without limitation, any of numerous different types of apparatus for converting any of various forms of energy into mechanical force or motion, or for converting one form of energy into another, such as the conversion of fuel into electricity.

The engine 10 comprises an engine block 12 which has formed therein several cylinder walls 14. Each cylinder wall 14 defines a cylinder bore 18, and a respective piston 16 is slidably received within each cylinder bore. Each piston 16 is coupled to a connecting rod 20, and each connecting rod is in turn coupled to a crank shaft (not shown) for converting the reciprocating motion of the pistons to rotary motion for driving a vehicle.

A block coolant jacket 22 surrounds the cylinder walls 14, and is spaced from the cylinder walls, thus defining a block coolant chamber 24 for receiving a liquid coolant to transfer heat away from the heat-generating components of the engine. The preferred coolant used in the system of the present invention is a substantially anhydrous, boilable liquid coolant having a saturation temperature higher than that of water. One such coolant is propylene glycol with additives to inhibit corrosion, as described in the above-mentioned co-pending patent application.

The coolants used in the system of the present invention are also preferably organic liquids, some of which are miscible with water and others which are substantially immiscible with water. The coolants that are miscible with water can tolerate a small amount of water. However, in accordance with the present invention, the water content of the coolant is maintained at a relatively low level, which is always less than about 5% (by weight), and preferably less than about 3% (by weight). Suitable coolant constituents that are miscible with water include propylene glycol, ethylene glycol, tetrahydrofurfuryl alcohol, and dipropylene glycol. Coolants that are immiscible with water might contain trace amounts of water as an impurity, usually less than one percent (by weight). Suitable coolant constituents that are substantially immiscible with water include 2,2,4-trimethyl-1,3-pentanediol monoisobutyrate, dibutyl isopropanolamine and 2-butyl octanol. All of these preferred coolant constituents have vapor pressures significantly less than that of water at any given temperature, and have saturation temperatures above about 132° C. at atmospheric pressure.

A cylinder head 26 is mounted to the engine block 12 above the cylinder walls 14. The cylinder head 26 defines a combustion chamber dome 27 above each cylinder bore 18, and a combustion chamber is thus defined between each piston and combustion chamber dome. A head gasket 28 is seated between the cylinder head 26 and the engine block 12, and the cylinder head includes a head coolant jacket 30 defining a head coolant chamber 31 for receiving the liquid coolant to transfer heat primarily from the combustion chamber domes and other heat-generating components of the head. The head gasket 28 seals the combustion chambers from the coolant chambers and, likewise, seals the coolant chambers from the exterior of the engine (or the engine's ambient atmosphere).

A plurality of coolant ports 32 extend through the base of the cylinder head 26, through the head gasket 28, and through the top of the block coolant jacket 22. The engine coolant can thus flow either from the head coolant chamber 31, through the coolant ports 32, and into the block coolant chamber 24 (currently referred to as a "reverse-flow" configuration), or in the opposite direction (currently referred to as a "conventional-flow" configuration). The currently preferred direction, however, is from the head coolant chamber 31 into the block coolant chamber 24, as described in U.S. Pat. No. 5,031,579.

The engine 10 further comprises a valve cover 34 mounted on top of the cylinder head 26, and an oil pan 36 mounted to the bottom of the block 12 to hold the engine's oil. If necessary, an oil cooling system (not shown), known to those skilled in the pertinent art, can be employed to maintain the engine oil temperature below a certain level. For example, an air-to-oil or liquid-to-oil system may be employed.

A coolant outlet port 38 extends through a bottom wall of the coolant jacket 22, and is in fluid communication with the coolant chamber 24. A first coolant line 40 is coupled on one end to the coolant outlet port 38 and coupled on the other end to the inlet port of a pump 42. The outlet port of the pump 42 is coupled to a second coolant line 44 and a third coolant line 46.

As described in further detail in U.S. Pat. No. 5,031,579, the size of the pump 42 is selected to achieve the coolant flow rates required under different operating loads, and the distribution of the coolant flow through the coolant chambers is selected in order to promptly condense within the bulk coolant substantially all coolant vapor generated upon contact with the hotter metal surfaces of the engine. In the preferred reverse-flow configuration, the engine 10 preferably includes a "rear-flow" head gasket 28 with coolant ports 32 which are located in order to distribute the coolant along the following path: from the front of the head coolant chamber 31 to the rear of the chamber; down through the coolant ports 32 and into the rear of the block coolant chamber 24; and then from the rear of the block coolant chamber 24 to the front of the chamber, where the coolant is discharged through the first coolant line 40. In an exemplary 350 cubic inch (5.7 L), V-8 engine constructed in accordance with the present invention and having a rear-flow head gasket, the pump 42 was selected to pump the coolant at a flow rate of about 63 gallons per minute ("GPM") at an engine speed of about 5,200 revolutions per minute ("RPM"). The bulk coolant temperature was typically about 100° C. (212° F.), and the rate at which heat was transferred to the coolant was typically about 5000 BTU/min.

The second coolant line 44 may be connected to a proportional thermostatic valve (PTV) 48 in order to facilitate controlling the bulk coolant temperature during engine operation. The PTV 48 is connected to a bypass line 50 and a radiator line 52, and is set to detect a threshold temperature of the coolant flowing through the second coolant line 44. If the temperature of the coolant is below the threshold, then depending upon the level of the temperature, the PTV 48 directs a proportional amount of coolant through the bypass line 50. If, on the other hand, the coolant temperature is above the threshold, the PTV 48 directs the coolant into the radiator line 52.

The other end of the radiator line 52 is coupled to a radiator 54, and an electric fan 56 is mounted in front of the radiator and is powered by a vehicle battery 58. The fan 56 is controlled by a thermostatic switch 60 which is in turn connected to the radiator line 52. Depending upon the temperature of the coolant in the radiator line 52, the thermostatic switch 60 operates the fan 56 to increase the airflow through radiator 54, and thus increase the rate of heat exchange with the hot coolant. As may be recognized by those skilled in the pertinent art, the fan may be eliminated if not required for temperature control, or alternatively, may be mechanically driven.

Both the output of the radiator 54 and the other end of the bypass line 50 are connected to an engine input line 62. The input line 62 is in turn connected to an input port 64 extending through a top wall of the cylinder head 26. Thus, depending upon the temperature of the coolant flowing through the second coolant line 44, the coolant flows either through the bypass line 50 or the radiator 54, which are both in turn connected to the input line 62. During engine warm-up, for example, when the coolant temperature is relatively low, the coolant is directed by the PTV 48 through the bypass line 50. However, once the engine is warmed up, a substantial portion of the coolant is usually directed through the radiator 54. The lower temperature coolant flowing through the input line 62 flows through the input port 64 and back into the cylinder head coolant chamber 31.

The style of radiator 54 can be any of a number of radiator styles available to those of ordinary skill in the pertinent art (e.g., cross-flow, down-flow, etc.). In one embodiment of the invention, wherein the engine is a 350 cubic inch (5.7 L) V-8, the radiator 54 has a parallel-finned tube construction with the following approximate dimensions: 394 mm high; 610 mm wide; 69.9 mm thick; and a substantially constant wall thickness of about 2.8 mm. The radiator is made of aluminum and has two rows of tubes with thirty-eight tubes in each row. Each tube has a substantially oval cross-sectional shape and is about 25.5 mm to 32 mm wide, by about 2.3 mm high (i.d.), and 518 mm long. The radiator 54 can be made of aluminum or other suitable material which will not be corroded or otherwise damaged by the coolants used in accordance with the present invention.

It should be noted that the radiator 54 is not required to retain gases, as with most known systems, and therefore does not have to be positioned above the highest level of coolant. The shape of the radiator can also be unique. For example, it may be curved or made relatively low and with greater horizontal depth in comparison to radiators for water-based coolant systems, to accommodate, for example, an aerodynamic-shaped vehicle.

As also shown in FIG. 1A, if necessary, a passenger compartment heater 68 may be connected between the third coolant line 46 and the engine input line 62. The heater 68 may be mounted on the vehicle to heat its interior compartment by heat exchange with the hot coolant. A valve 66 is mounted within the third coolant line 46 to control the flow of coolant to the heater. If the valve 66 is closed, then the coolant discharged by the pump 42 flows into the second coolant line 44. Otherwise, depending upon the degree to which the valve 66 is opened, a portion of the hot coolant flows through the heater 68. The coolant discharged by the heater 68 flows through the engine input line 62, and back into the head coolant chamber 31.

It is often found desirable to mount an air-bleed valve 70 within the input line 62 above the engine input port 64. The air-bleed valve 70 is located at or above the highest coolant level in the engine, which is indicated by the dotted line A in FIG. 1. The air-bleed valve 70 is provided to bleed air or other gases or vapors from the engine cooling system when it is being filled with coolant.

A vent port 72 extends through an upper portion of the cylinder head 26, and is connected to a vent line 74 of a temperature-controlled expansion reservoir 76 in order to exhaust gases and/or vapors from the engine coolant chambers into the vent line of the reservoir and to permit coolant flow between the reservoir and engine coolant chambers with thermal expansion and contraction of the coolant. The vent port 72 may be connected to any relatively low-pressure area on the draw side of the pump 42 and radiator 54 within the cooling circuit in order to effectively exhaust the expanded coolant and vapors. However, in order to substantially completely exhaust any non-condensable gases (e.g., gases introduced into the cooling system when filling the system with coolant, or due to a combustion gasket leak) and trace vapors, the preferred location for the vent port is within an upper region of the highest coolant chamber 31, as shown.

The vent line 74 is connected to an inlet port 78 of the expansion reservoir 76, and the reservoir forms within its hollow interior at least one temperature-controlled coolant expansion chamber 80 for receiving coolant, non-condensable gases and trace amounts of vapor, if any, from the engine coolant chambers. The coolant expansion chamber 80 defines a predetermined volume selected to receive and store coolant in response to thermal expansion of the coolant within the engine coolant chambers during engine operation, and in the preferred embodiment, the coolant expansion chamber is vented to the engine's ambient atmosphere to maintain the pressure within the reservoir, and thus the static pressure of the engine coolant chambers below a predetermined pressure limit during normal engine operation. In the embodiment of the present invention illustrated, the predetermined pressure limit is approximately equal to or below the engine's ambient pressure, and therefore is typically less than about four (4) psig. However, as will be recognized by those skilled in the pertinent art, the static pressure of the engine may be adjusted to achieve any desired predetermined pressure limit during normal engine operation.

In the embodiment of the present invention illustrated, the expansion reservoir 76 includes a hollow housing 82 forming within its hollow interior the temperature-controlled coolant expansion chamber 80. As shown in FIG. 1, the coolant expansion chamber 80 defines a cold coolant level "B" and a hot coolant level "C"; and the inlet port 78 is preferably located in the base portion of the housing below the cold coolant level "C" in order to maintain a liquid barrier between the upper region of the reservoir and head coolant chamber 31. A vent port 84 is connected on one end to the upper region of the reservoir housing 82 in fluid communication with the coolant expansion chamber 80, and is connected on the other end to a vent line 85 open to the engine's ambient atmosphere in order to ventilate the expansion chamber. The reservoir housing 80 also includes a fill neck 86 formed on the top wall of the housing and defining a fill opening (not shown) which may be used for receiving coolant in order to fill and/or top-off the system with coolant, and a fill cap 88 is removably attached to the fill neck to seal the opening. As may be recognized by those skilled in the pertinent art, the expansion reservoir of the invention may take any of numerous different shapes and/or configurations in order to perform the various functions of the reservoir as disclosed herein.

The cooling system of the invention further includes means for heating the coolant within the expansion reservoir 76 to a temperature at or above a predetermined temperature during a substantial period of engine operation for vaporizing substantially all water from the coolant and thereby maintaining the coolant in a substantially anhydrous state. As is described in further detail below, in the currently-preferred embodiment of the invention, the predetermined temperature is at least approximately 70° F. (21.1° C.), and preferably at least approximately 90° F. (32.2° C.), in order to maintain the water content of the coolant at a level of less than approximately 5% (by weight), and preferably less than approximately 3% (by weight) during a substantial period of engine operation.

As shown schematically in FIG. 1, the expansion reservoir 76 is mounted within a temperature-controlled desorption environment 90 which is selected and/or constructed in order to heat the coolant within the expansion reservoir to, and/or maintain the coolant at a temperature at or above the predetermined temperature during a substantial period of engine operation. Preferably, the desorption environment 90 is formed by the area within the engine bay located on the exhaust side 92 of the radiator 54 and surrounding or substantially surrounding the engine 10. Thus, for typical front engine vehicles, as indicated schematically in FIG. 1, the desorption environment 90 may be formed by the combined structure 94 of the front bulkhead and inner fenders, the rear firewall 96, and the vehicle hood 98. For rear or mid-engine vehicles, on the other hand, the "front" and "rear" designations will vary; however, the construction will be essentially the same. Preferably, the expansion reservoir 76 is mounted within the upper regions of the desorption environment 90 where the air is relatively stagnant and the waste heat of the engine can become trapped.

The vent line 74 normally carries primarily expanded coolant during engine warm-up, and to a lesser extent insubstantial amounts of non-condensable gases (and trace amounts of coolant or water vapor, if they exist). The non-condensable gases typically become entrained within the coolant when the system is initially filled with coolant or due to leaks (e.g., head gasket leaks). The reservoir 76 is therefore normally required to handle only the gradual passage of coolant expanded by temperature variations within the engine cooling system (primarily during engine warm-up from cold start to operating temperature). During the complete time period of the full warm-up cycle, the total volume of thermally-expanded coolant received in the reservoir 76 is typically about 4% to 6% of the total coolant volume. The vent line 74 may therefore define a relatively small internal diameter, typically about ¼ to 5/16 of an inch, without creating significant flow restriction or back pressure. Additionally, as explained below, because the change in total coolant volume during engine operation can be accurately predicted, the volume of the housing 82 can likewise be accurately designed to accommodate the thermal expansion of the coolant and may be relatively small.

The operation of the expansion reservoir 76 within the temperature-controlled desorption environment 90 is predicated upon the hygroscopic nature and vapor pressure of the preferred diol coolants, and the frequent natural abundance of water vapor and its vapor pressure in the ambient air. As summarized below, testing has shown that when propylene glycol is exposed to ambient air at a mean temperature of about 60° F. (15.5° C.), the water content of the coolant will increase relatively rapidly and exceed the preferred level (3% by weight).

Coolant Type: Propylene Glycol
Coolant Volume: Two Gallons
Ambient Humidity: 40% to 60%
Test Period: Ten Months
Results (% water by weight):
  Month 1: 0.05% water (Start)
  Month 5: 4.10% water
  Month 7: 6.70% water
  Month 9: 8.90% water
  Month 10: 10.10% water (End)

As borne out by these test results, because of the hygroscopic characteristics of propylene glycol, the effective life of this coolant under relatively normal temperature and humidity conditions could be less than about four months without an effective moisture restriction means, such as the dehydrating unit (or desiccant-filled canister) disclosed in my U.S. Pat. No. 5,031,579. Several "in-vehicle" tests with a system like that disclosed in the '579 patent, but without the use of a desiccant-canister or like dehydrating unit produced the same general results whereby the propylene glycol coolants exceeded the preferred 3% water content level within about three to four months following installation.

Similar tests were also conducted in a vehicle employing a cooling system having a dehydrating unit of the type disclosed in the '579 patent. In the test vehicle, the desiccant canister defined an outer diameter of approximately 2.5 inches, a length of approximately 3.5 inches, and contained approximately 69 grams of desiccant material. Typically, within a period of about 6 months, the desiccant would become saturated with about 12 grams of water. At that point, the canister would either have to be replaced, or would have to be removed and desorbed within an oven heated to a temperature of about 500° F. (260° C.) for about 3 hours. This could be a relatively substantial inconvenience, and in turn have a negative effect on the commercialability of the cooling system.

Based on further research, the present inventor realized that a substantially continuous moisture desorption feature could be constructed within a cooling system of the type disclosed herein by utilizing the significant differences between the vapor pressures of diols (preferably propylene glycol) and water at temperatures greater than about 70° F. (21.1° C.), and preferably at or above 90° F. (32.2° C.). An additional advantage was also realized in that the desorption feature constructed in the manner disclosed herein could be relatively permanent, require little, if any maintenance, and could substantially continuously maintain the water content of the coolant at or below the preferred 3% level.

Every liquid substance has a characteristic vapor pressure defined as the pressure at any given temperature of the vapor in equilibrium with its liquid form. As set forth in the chart below, for both water and propylene glycol, the vapor pressures increase with increasing temperature. However, propylene glycol has a substantially higher boiling point than does water, and at each temperature, propylene glycol defines a significantly lower vapor pressure than does water. Indeed, all glycols (including propylene glycol) are considered relatively high "boiling point" liquids because of their relatively low vapor pressures at any given temperature in comparison to water.

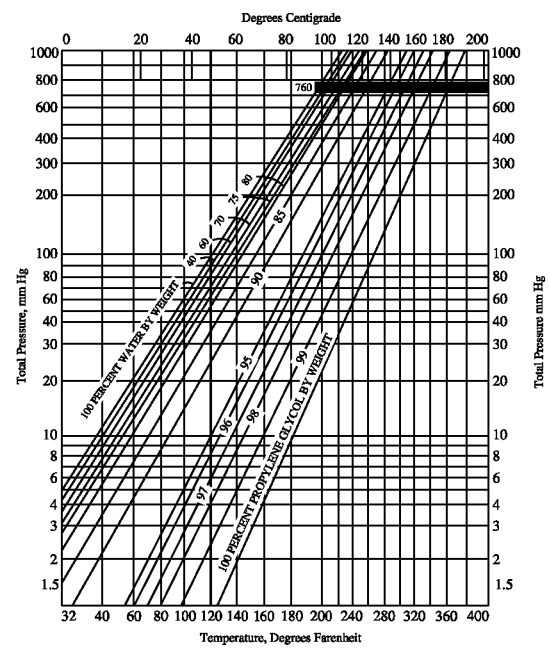

Note, for example, that at about 80° F. (26.6° C.) the vapor pressure of the water is over 100 times that of propylene glycol, and at 200° F. (93.3° C.) the vapor pressure of water (about 600 mm Hg) is still significantly higher than that of propylene glycol (about 18 mm Hg). Thus, with increasing temperatures above about 70° F. (21.1° C.), the water fraction of the coolant becomes highly active and increasing its rate of vaporization, whereas the propylene glycol remains relatively stable substantially without any vaporization. At temperatures below about 70° F. (21.1° C.), on the other hand, the hygroscopicity of propylene glycol becomes dominant over the evaporation rate of the water fraction, and thus as demonstrated by the test results above, if there is ambient humidity, the water content of the coolant will increase to unacceptable levels over time.

As reflected in the two charts below, tests performed both in vehicles and on a dynamometer have demonstrated that when the desorption environment 90 of the expansion reservoir 76 is maintained at or above at least about 70° F. (21.1° C.) during the majority of operating hours of the engine (i.e., greater than about 50% of the total periods of engine operation), the absorption rate of the propylene glycol (which varies with temperature) will stabilize and reach a point of equilibrium with the desorption rate of the water fraction, and the water content of the coolant will be maintained at or below the preferred level of 3% water (by weight) during at least 75% of the time over the life of the engine. More specifically, if the desorption environment 90 is maintained during a majority of the period of engine operation at a temperature within the range of about 70° F. (21.1° C.) through about 200° F. (93.3° C.), the water content of the propylene glycol will stabilize at about 2% (by weight).

| Sample Date | Mileage | Percentage Water |
| --- | --- | --- |
| In-Vehicle Test | | |
| 8/5/Year 1 | 0 (start) | 0.02% |
| 12/6/Year 2 | 30,000 | 1.9% |
| 3/23/Year 3 | 41,000 | 2.0% |
| 8/24/Year 3 | 50,000 | 2.1% |
| 2/6/Year 4 | 60,000 | 1.9% |
| 11/8/Year 4 | 79,000 | 2.1% |
| 4/5/Year 4 | 87,000 (on-going) | 2.1% |
| Dynamometer Test | | |
| 5/7/Year 1 | 0 (start) | 0.01% |
| 12/5/Year 2 | 1,000 | 2.2% |
| 11/10/Year 3 | 4,000 | 2.1% |
| 7/27/Year 4 | 6,000 | 1.9% |
| 4/25/Year 5 | 8,000 (on-going) | 2.1% |

As described above with reference to FIG. 1B, in cool to moderate-temperature regions (e.g., Northeastern United States), the desorption environment 90 is preferably formed behind the front bulkhead 94 with the expansion reservoir 76 mounted in the upper region of the desorption environment where the air tends to be relatively stagnant and the waste heat of the engine can become trapped. It has been found that in typical vehicle installations this region will generally rise to temperatures at or above 70° F. (21.1° C.) during engine operation, even at ambient temperatures as low as 0° F. (−17.7° C.). When the ambient temperature is less than about 0° F. (−17.7° C.), there is frequently insufficient ambient humidity to cause the water content of the coolant to rise above the preferred level, thus obviating the need to maintain the temperature of the coolant in the reservoir at or above the predetermined level.

However, if conditions exist whereby there are relatively high levels of humidity at low ambient temperatures, or where the installation of the engine, or construction of a vehicle does not lend itself to or otherwise permit the construction of a desorption environment similar to that shown in FIG. 1B, additional steps may be taken to ensure that the temperature of the coolant in the reservoir is maintained at or above the predetermined temperature to thereby maintain the coolant in a substantially anhydrous state. First, as described in further detail below, auxiliary heating systems of the type illustrated in FIGS. 2A, 2B and 3 may be employed to heat the coolant in the reservoir to a temperature at or above the predetermined temperature. Alternatively, if the cooling system is installed in a motor vehicle, the expansion reservoir 78 may be installed in close proximity to one or more heat-emitting vehicle components, such as the vehicle's exhaust system.

In addition, heat ducting with appropriate thermal insulation of a type known to those skilled in the pertinent art may be placed around and/or adjacent to the reservoir in order to direct thermal energy from the exhaust system or other heat-emitting components of the engine and/or vehicle toward the reservoir, and in turn retain a substantial portion of such energy in or around the reservoir for a time period sufficient to heat the coolant to a temperature at or above the predetermined temperature. In installations with open engine compartments (e.g., stationary engines for generators and/or pumps), the expansion reservoir may utilize such ducting, or be placed adjacent to one or more heat-emitting components of the exhaust system, or alternatively, the reservoir may be placed immediately adjacent to the exhaust side of the radiator within the flow path of the relatively warm air discharged by the radiator.

For installations where the ambient temperature is extremely high, on the other hand, it may be possible to place the reservoir in front of the bulkhead (i.e., on the inlet side of the radiator) in close proximity to the radiator. However, the preferred location of the expansion reservoir is behind the bulkhead, as shown, in order to maintain the coolant within the expansion chamber of the reservoir as hot as possible.

In each of these instances, the coolant within the expansion chamber 80 of the reservoir would be heated to, or maintained at a temperature at or above 70° F. (21.1° C.), and preferably at or above 90° F. (32.2° C.), during a majority of the time periods within which the engine is operating. At these temperatures, the water fraction of the coolant will be forced out of the coolant into the upper region of the chamber 80 and will typically then flow out through the vent port 84 and vent line 85 into the engine's ambient atmosphere. Small temperature changes within the engine will cause the volume of the coolant to slightly expand and/or contract during engine operation, thereby causing the coolant to flow in both directions between the engine coolant chambers and the reservoir and in turn intermixing the coolants of the different chambers. As a result, any water vapor generated within the engine coolant chambers 24 and 31 during engine operation gradually flows into the vent line 74, through the coolant expansion chamber 80 and into the engine's ambient atmosphere; the water fraction of the coolant within the expansion chamber 80 is vaporized, flows through the vent port 84 and into the engine's ambient atmosphere; and the resultant anhydrous coolant from the expansion reservoir (having a water content of less than 5%, and preferably less than 3%) gradually flows back into the coolant chambers, in such a continuous cycle, to thereby maintain the coolant throughout the system in a substantially anhydrous state.

As indicated above, in the preferred operation of the engine 10, the coolant flows in the direction from the head coolant chamber 31 into the engine block coolant chamber 24. The coolant flow rate through the pump 42 and flow distribution is determined in the manner disclosed in U.S. Pat. No. 5,031,579 (which is hereby expressly incorporated by reference as part of the present disclosure), so that when some of the coolant does vaporize upon contact with the hotter metal surfaces of the engine, the vaporized coolant is condensed by the lower temperature coolant in the coolant chambers before the vapor reaches the vent port 72.

Propylene glycol has an atmospheric saturation temperature of about 369° F. (187° C.) and a pour point of about −57° C. (−70° F.). Therefore, with propylene glycol, the bulk of the coolant can be maintained up to a temperature as high as about 340° F. (160° C.) without pump cavitation. However, normally a more preferable peak operating temperature is about 250° F. (120° C.). The greater the difference between the saturation temperature and the bulk coolant temperature, the greater is the ability of the bulk coolant to condense the vaporized coolant within the coolant chambers. Although in some instances the coolant temperature in the system of the present invention might be intentionally operated substantially higher than that of a system using conventional coolants, such as a typical mixture of ethylene glycol and water ("50/50 EGW"), the cooling system of the invention remains effective because the conditions required for "nucleate boiling" are maintained during severe or "hot" engine operating conditions.

Nucleate boiling occurs when the layer of coolant which is in direct contact with metal surfaces is heated to a temperature beyond the boiling point of the coolant. The engine's heat transfer to coolant, increased by nucleate boiling, is greatest at the junction of the above-mentioned coolant layer between the metal surfaces and the turbulent (flow induced) or agitated (early-stage boiling induced) coolant. In the phase change from liquid to vapor (nucleate boiling), the coolant vapor carries a considerably greater amount of heat than does liquid phase heat transfer. The vapor bubbles generated upon boiling the coolant when breaking away from the engine's surfaces draw new liquid coolant into contact with these surfaces to replace the vaporized coolant. Therefore, under conditions of ideal nucleate boiling, critical engine metal temperatures are maintained by the boiling point of the coolant.

"Vapor blanketing" occurs if the liquid coolant is displaced from contact with the metal surfaces of the engine by a vapor layer caused by surface boiling and vapor accumulation at critical metal surfaces. Vapor blanketing causes the metal surfaces to become insulated from the coolant, interrupting the heat transfer and, therefore, permitting a sharp increase in metal temperature. Hot spots develop across the combustion dome and then initially moderate spark knock occurs, and later severe knocking occurs as the vapor blanketing persists.

The system of the present invention overcomes this problem by distributing the coolant through the engine coolant chambers in a predetermined manner, and by pumping the coolant at a flow rate selected to maintain nucleate boiling conditions on engine surface areas that undergo a substantial heat flux (e.g., the cylinder head combustion domes), as described in U.S. Pat. No. 5,031,579. In addition, the preferred relatively low predetermined pressure limit within the expansion reservoir 76 (at ambient and/or below about 4 psig) maintains the boiling point of the coolant at a relatively low level to facilitate nucleate boiling and thereby maintain relatively low critical engine temperatures.

Because the coolant vapor produced at any given engine load or condition is substantially and promptly condensed by the bulk coolant within the coolant chambers, there is little, if any, entrained vapor persisting within the system, and as a result, there is essentially no accumulation of vapor, or variation of the amount of vapor within the system, thus stabilizing the volume of thermally-expanded coolant and permitting an accurate determination of the requisite operating volume of the coolant expansion chamber 80. Coolant expansion is therefore due substantially entirely to the liquid's thermal expansion, predictable and relatively constant at each engine operating temperature.

If the cooling capacity of the radiator is inadequate to stabilize engine temperature to a selected thermostat setting at a given engine load and ambient temperature, then the bulk coolant will increase in temperature to a higher stabilized point for each engine operating load and ambient temperature, and the resultant thermal-expansion of coolant will cause its volume to increase to a stabilized level for the respective higher coolant temperature. At each stabilized point, however, the coolant volume will remain constant (without the accumulation of entrained, transient coolant vapor).

Rather than operate the expansion reservoir at about ambient pressure as described above, the entire cooling system may be pressurized to any level higher than ambient (i.e., greater than about 4 psig) by employing a pressurized vent valve (not shown) at the vent port 84 of the reservoir, or by sealing the vent port and employing a conventional radiator cap 88 incorporating a pressure-relief valve (not shown) set to open at a desired operating pressure. If it is desired or deemed necessary to operate the engine coolant chambers pressurized and the expansion reservoir 76 at about ambient pressure, then the pressure-relief valve (not shown) may be located on the inlet side of the expansion reservoir at any point between the vent port 72 of the cylinder head and the inlet port 78 of the expansion reservoir. For each increasing pressure level, there would be a resultant and predictable increase in the engine metal temperatures effected by nucleate boiling. Thus, the predetermined static operating pressure of the cooling system, and the critical operating temperatures of the metal surfaces of the engine chambers can be selected in the design of the cooling system.

The pressure-relief valve employed in each of these alternative configurations is preferably a "two-way" valve permitting coolant, gases or vapors to be drawn back into the expansion reservoir 76, or permitting coolant to be drawn back into the engine coolant chambers 31 and 24 during engine cool down. Accordingly, when the relief valve is mounted at the vent port 84, the static pressure of the cooling system during engine operation will be maintained approximately equal to the pressure setting of the relief valve. During periods of engine warm-up, cool-down, and shut-down, when the pressure within the expansion chamber 80 is below the pressure setting of the relief valve, the reservoir and engine coolant chambers will be sealed from the engine's ambient atmosphere, thus preventing the coolant from absorbing any water from the ambient environment. On the other hand, during the periods when the engine is running and/or when the pressure within the engine coolant chambers and expansion chamber otherwise exceeds the pressure setting of the relief valve, and the relief valve opens, the expansion reservoir will be ventilated to the engine's ambient atmosphere. However, also during these elevated-pressure periods, the temperature of the coolant within the expansion chamber 80 will be at or above the predetermined temperature of at least about 70° F. (21.1° C.), and preferably at least about 90° F. (32.2° C.), thus causing substantially all water within the coolant to vaporize, and in turn be forced above the hot coolant level "C" and out through the vent port 84 into the engine's ambient atmosphere. As a result, the cooling system of the invention prevents the coolant within the expansion reservoir from absorbing back into the coolant water vapor that might otherwise exist within the reservoir above the hot coolant level "C" or from the engine's ambient atmosphere.

If, on the other hand, the pressure-relief valve is mounted on the inlet side of the expansion reservoir between the inlet port 78 and vent port 72, the reservoir 76 will be continuously ventilated to the engine's ambient atmosphere in order to desorb the coolant within it, and the engine coolant chambers and other portions of the cooling system will be pressurized (in accordance with the setting of the relief valve) during engine operation.

As may be recognized by those skilled in the pertinent art, in some instances, or if desired, the liquid barrier within the expansion reservoir may be formed only within the vent line 74 when the engine and coolant is relatively "cold", such that the expansion chamber would only receive thermally-expanded coolant during engine operation. Alternatively, the vent line 74 could perform both functions itself by receiving the liquid barrier and expanded coolant, and the housing 82 of the reservoir would in turn define only a chamber 80 for receiving non-condensable gases and trace vapors, if any. In each of these instances, the vent line 74 would be located substantially entirely within the desorption environment 90 and would define an internal volume sufficient for forming a temperature-controlled coolant expansion chamber for performing both functions. This could be achieved, for example, by forming the vent line with a relatively large internal diameter (e.g., approximately 0.75 inch (1.9 cm) or greater). Alternatively, this may be desirable in applications where the reservoir housing 82 is spaced at such a distance from the vent port 72 that a relatively lengthy vent line, defining a relatively large internal capacity, is required. In each of these instances, the vent line 74 would establish a "cold fill" coolant level approximately the same as the coolant level "A" of FIG. 1. Typically, the cold fill coolant level of the vent line would be located between the vent port and the top of the "high loop" of the vent line (shown typically by the U-shaped portion of the vent line in FIG. 1).

One advantage of the cooling system of the invention is that any non-condensable gases, such as air or other gases introduced into the coolant chambers (e.g., gases trapped when filling the system with coolant, or resulting from a leak in the combustion gasket), will flow during engine operation from the coolant chambers 24 and 31, through the expansion reservoir 76 and into the engine's ambient atmosphere.

Another advantage of the present invention is that the coolant expansion reservoir 76 may be mounted in any of numerous convenient locations on a vehicle which, if desired, may be remote from the engine 10. As indicated above, although in many instances it will be convenient, it is not necessary to mount the reservoir 76 either near the engine 10 or above the highest coolant level "A", as is frequently required for conventional expansion tanks or condensers in other engine cooling systems. However, as shown in FIG. 1, the vent line 74 may in some instances define a U-shaped section extending above the highest coolant level "A", whereby any water vapor or non-condensable gases that do rise through the head coolant chamber 31 will pass through the vent line 74 and into the reservoir housing 82, as described previously.

The U-shaped section of the vent line 74 also allows for "cold system" inspection when the reservoir 76 is mounted below the highest level of coolant "A". In this situation, the fill cap 88 may be removed, and the hollow interior of the reservoir may be visually inspected without causing gravitational loss of coolant through the fill opening. In addition, if the vent line 74 defines a relatively small internal diameter as described above (e.g., about ¼ to ⁵⁄₁₆ of an inch) and the U-shaped section of the vent line is located at a sufficient height above the maximum coolant level "A" (and no leaks exist before the high loop), then syphonic action or "coolant drain down" will not occur when the fill cap 88 is removed for inspection. Alternatively, if the reservoir 76 is mounted relatively high on the vehicle so that the inlet port 78 is located above the maximum coolant level "A", then the U-shaped section of the vent line 74 may likewise be eliminated.

Another advantage of the cooling system of the present invention is that there is no need for a condenser mounted above the engine to condense vaporized coolant. Instead, because of the coolant flow rate and preferred distribution, the vaporized coolant is condensed within either the head coolant jacket 30, or the block coolant jacket 22 by the liquid coolant. In the hotter regions of the cylinder head 26, such as over the combustion chamber domes 27, or around the exhaust runners, some coolant inevitably vaporizes, in the form of nucleate boiling, under all operating conditions. However, by employing the system of the present invention, substantially all of the coolant is maintained at a temperature significantly below its saturation temperature. Therefore, substantially all of the vapor formed in the hot regions will condense in the liquid coolant within the coolant chambers.

Moreover, the preferred flow rate and distribution of coolant in the present invention makes the flow relatively turbulent in comparison to typical water-based coolant systems. The turbulent flow agitates the coolant vapor on the metal surfaces of the engine and thus typically increases the rate of heat exchange between the vapor and liquid coolant, the occurrence of nucleate boiling, the release of vapor off of the surfaces of the engine, and the condensation of such vapor within the adjacent bulk coolant.

Turning to FIGS. 2A and 2B, another engine embodying a cooling system of the present invention is indicated generally by the reference numeral 10. The cooling system of the engine 10 is substantially the same as that described above in relation to FIGS. 1A and 1B, and therefore like reference numerals are used to indicate like elements. The cooling system of FIGS. 2A and 2B differs from the system of FIGS. 1A and 1B in that the reservoir 76 comprises an electrically-controlled heating assembly 100 for heating the coolant within the expansion chamber 80 of the reservoir to a temperature at or above the predetermined temperature in order to vaporize substantially all water from the coolant and thereby maintain the coolant in a substantially anhydrous state. In the preferred embodiment illustrated, the heating assembly 100 is controlled to heat the coolant to a predetermined temperature at or above at least approximately 70° F. (21.1° C.), and preferably at or above approximately 90° F. (32.2° C.). This embodiment of the invention is particularly desirable in situations in which the desorption environment 90 described above in connection with FIGS. 1A and 1B cannot be constructed, or in situations where it may be desirable to mount the reservoir in a region remote from the engine or heat-emitting components of the engine.

The heater assembly 100 includes on or more electric heating coils 102, such as a cal-rod heater, mounted within the base portion of the expansion chamber 80 below and within the cold and hot coolant levels "B" and "C", respectively, in order to efficiently heat the coolant to a temperature at or above the predetermined temperature. The heating coil 102 is electrically connected to a temperature sensor 104, which may be, for example, a thermocouple, also mounted within the base portion of the expansion chamber 80 for sensing the temperature of the coolant within the chamber. A heater control switch 106 is electrically connected to the temperature sensor 104 for receiving signals indicative of the coolant temperature, and to an ignition switch 108 of the vehicle for receiving signals indicative of the starting and stopping of the engine. The heater control switch 106 is also electrically connected between the heating coil 102 and the vehicle battery or other power source 58 in order to provide electrical current to the coil to heat the coolant within the reservoir.

Accordingly, when the ignition switch 108 is turned on to start the engine 10, the heater control switch 106 automatically closes to provide electric current from the power source 58 to the heater coil 102 to heat the coolant. When the coolant within the expansion chamber 80 is heated to a temperature at or above the predetermined temperature (at least about 70° F. (21.1° C.), and preferably at least about 90° F. (32.2° C.)), the temperature sensor 104 transmits an electrical signal to the heater control switch 106 in order to open the switch and turn off the coil. If the heater coil 102 is operating when the ignition switch 108 is turned off, the heater control switch automatically opens in order to terminate the flow of current from the power source 58 to the coil.

If desired, a delay timer (not shown) may be connected between the ignition switch 108 and the heater control switch 106 in order to permit the heater coil to continue to heat the coolant for a predetermined delay period after the engine is turned off. Accordingly, in this embodiment of the invention, the temperature of the coolant within the expansion chamber 80 may be relatively precisely and continuously regulated in order to ensure that the coolant is maintained at a temperature at or above the predetermined temperature during a majority of each period of engine operation regardless of the ambient conditions or the other characteristics of the engine's installation.

As will be recognized by those skilled in the pertinent art, the heater assembly 100 may take any of numerous different shapes and/or configurations in order to heat the coolant in the expansion chamber to a temperature at or above the predetermined temperature. For example, the assembly may comprise one or more coils or other electrical-heating elements that may be wholly or partially immersed within the coolant, mounted adjacent to the coolant in the expansion chamber, or may be mounted adjacent to or surround the reservoir to heat the reservoir and in turn heat the coolant.

Figure 3:
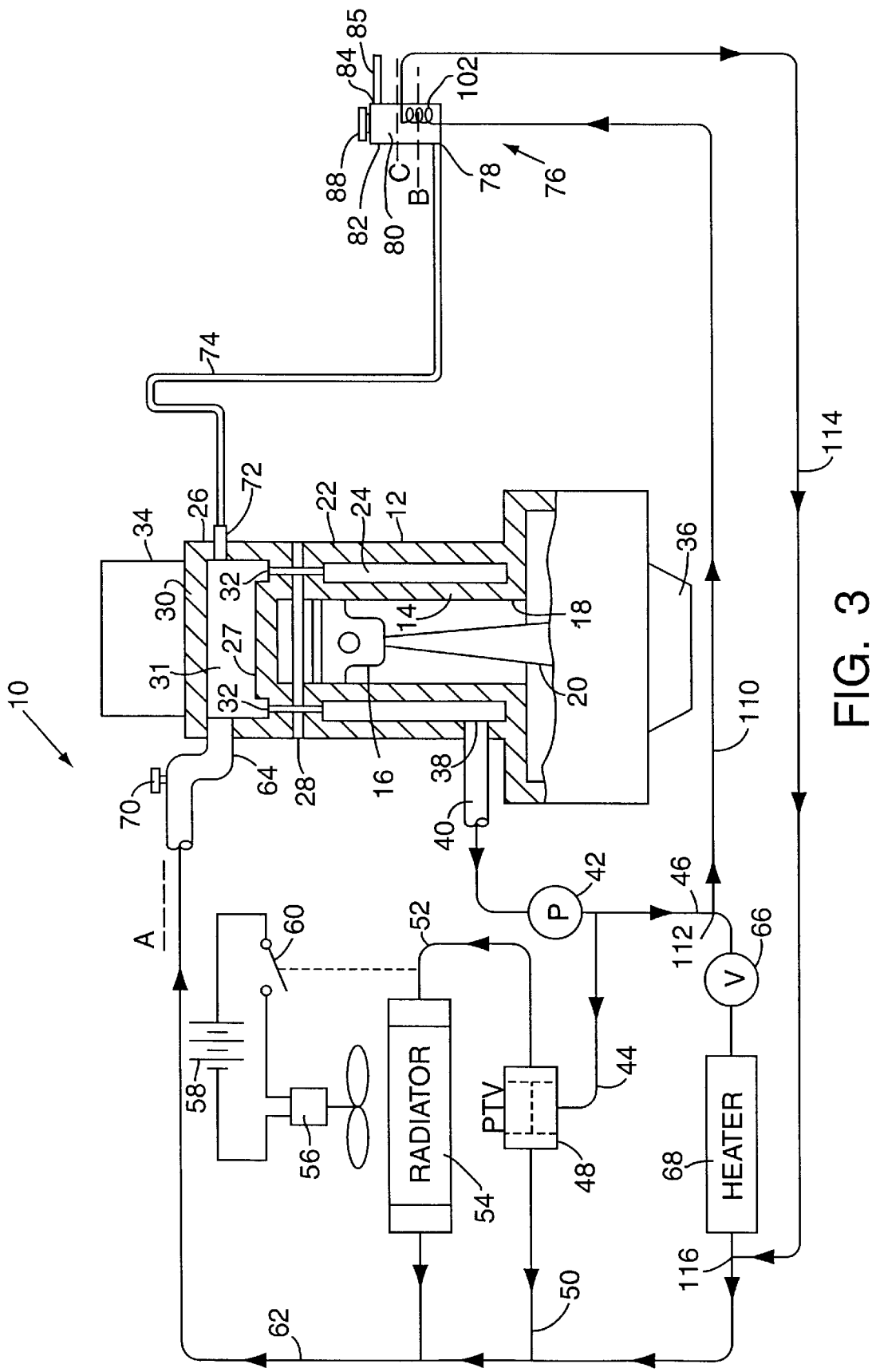
FIG. 3 is a schematic, partial cross-sectional view of another embodiment of an engine cooling system of the invention wherein the expansion reservoir includes a liquid-to-liquid heat exchange assembly for heating the coolant within the reservoir with relatively hot coolant discharged from the engine coolant chambers.

In FIG. 3 another engine embodying the cooling system of the present invention is indicated generally by the reference numeral 10. The cooling system of FIG. 3 is substantially similar to the cooling system of FIGS. 2A and 2B, and therefore like reference numerals are used to indicate like elements. The cooling system of FIG. 3 differs from the system of FIGS. 2A and 2B in that the heater coil 102 is not electrically actuated, but rather is heated by the flow of engine coolant therethrough.

A coolant inlet line 110 is connected on one end to a junction tee 112 mounted within the third coolant line 46 between the outlet side of the pump 42 and heater valve 66, and is connected on the other end to the inlet side of the heater coil 102 for directing relatively hot coolant from the pump to the coil. Accordingly, in this embodiment, the heater coil 102 comprises one or more hollow tubes or conduits of thermally-conductive material for receiving the flow of coolant therethrough. The heater coil 102 is preferably wound into the shape of a coil and immersed within the coolant of the expansion chamber 80 in order to form a liquid-to-liquid heat exchanger assembly; however, as will be recognized by those skilled in the pertinent art, any of numerous different shapes and/or configurations may be employed to efficiently and/or effectively transfer heat from the relatively hot coolant flowing through the inlet line to the coolant within the expansion chamber 80. A coolant outlet line 114 is connected between the outlet end of the heater coil 102 and a junction tee 116 mounted within the engine input line 62 for directing the coolant after heat exchange with the expansion reservoir back into the head coolant chamber 31.

During engine operation, the heater coil 102 will rise to about the operating temperature of the bulk coolant discharged from the engine coolant chambers (typically about 200° F. or 93.3° C.) and will in turn raise the temperature of the coolant within the expansion reservoir 76 to about the same level. The coolant within the expansion chamber 80 will thus be heated to and maintained at a temperature well above the predetermined temperature set forth above (at least about 70° F. (21.1.° C.), and preferably at least about 90° F. (32.2.° C.)) during a substantial period of engine operation in order to maintain the coolant in a substantially anhydrous state. After passage through the heater coil 102, the lower temperature coolant flows through the coolant outlet line 114 and into the engine input line 62 on the outlet side of the radiator 68.

If the vehicle does not include a heater 58 of the type illustrated in FIG. 3 or like heating circuit, the junction tee 112 and coolant inlet line 110 may be connected to the outlet side of the pump 42, and the coolant outlet line 114 and junction tee 116 may be connected at any desired point within the engine input line 62 in order to direct the coolant back into the engine coolant chambers. Alternatively, the coolant outlet line 114 and junction tee 116 may be connected to the second coolant line 44 for passage through the PTV 48, and in turn through either the radiator 54 or bypass line 50 prior to flowing into the head coolant chamber 31. In a conventional-flow system, on the other hand, the coolant inlet line 110 and junction tee 112 may be connected to a coolant line on the inlet side of the radiator 54 in order to receive relatively hot coolant discharged from the engine coolant chambers, and the coolant outlet line 114 and junction tee 116 may be connected downstream of the coolant inlet line in a manner similar to that described above for the reverse-flow configuration.

As may be recognized by those skilled in the pertinent art, it may be possible to heat the coolant in the reservoir to a temperature at or above the predetermined temperature by directing the flow of relatively hot coolant from the coolant inlet line 110 through the expansion chamber 80 without the heater coil 102. However, the heater coil or other liquid-to-liquid heat exchanger assembly is preferred in order to allow coolant to remain within the expansion chamber 80 for a period of time sufficient to vaporize substantially all of the water within the coolant into the engine's ambient atmosphere.

Figure 4:
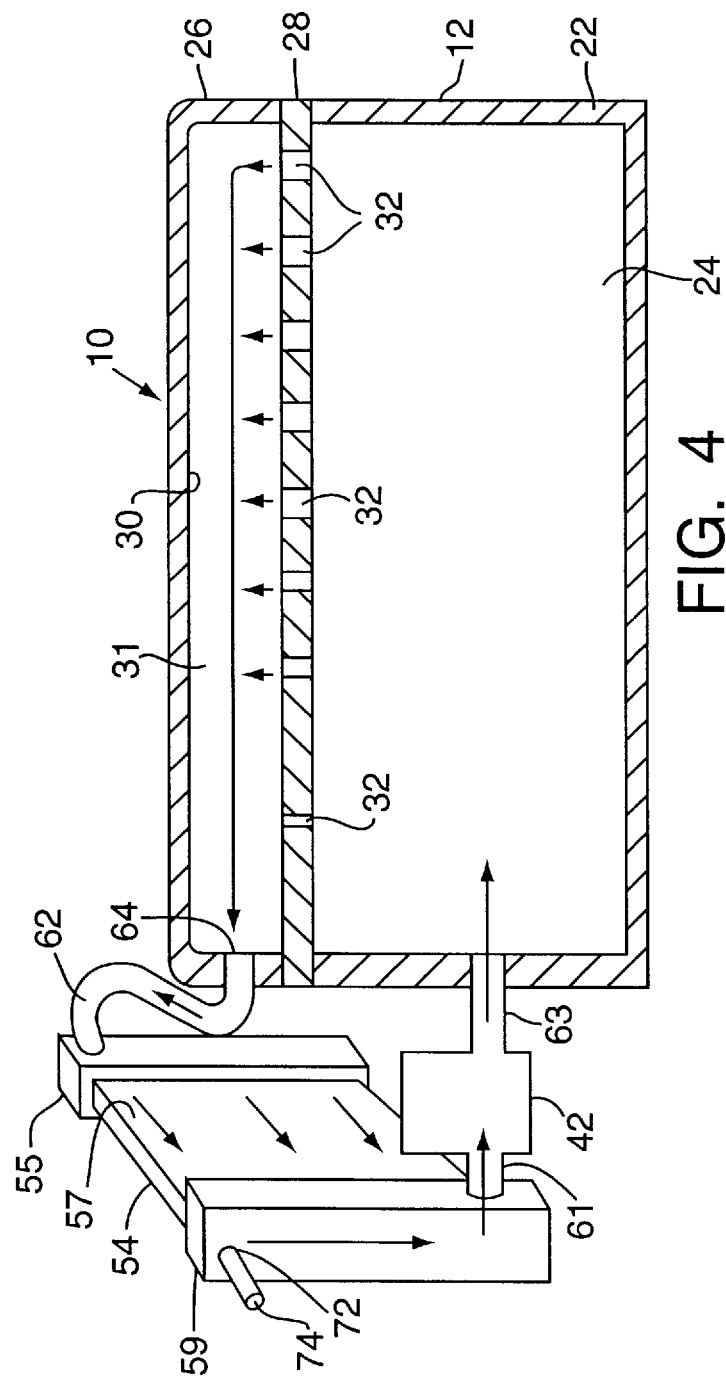
FIG. 4 is a schematic cross-sectional view of an engine configured to pump the coolant in a conventional-flow direction, as opposed to a reverse-flow direction, and is provided for purposes of explaining how this type of engine is modified or configured to incorporate a cooling system of the invention.

In FIG. 4, the cooling system of the engine 10 is configured to pump the coolant in a "conventional-flow" direction, as opposed to the "reverse-flow" direction described above with reference to FIGS. 1 through 3. The engine 10 of FIG. 4 is the same in many respects as those described above, and therefore like reference numerals are used to indicate like elements. As indicated by the arrows in FIG. 4, in a "conventional flow" system the coolant flows upwardly through the engine 10 in the direction from the engine block coolant chamber 24 into the head coolant chamber 31.

More specifically, as shown in FIG. 4, the radiator 54 includes an inlet tank 55, a liquid-to-air heat exchange core 57 including a plurality of core tubes for receiving hot coolant from the inlet tank, and an outlet tank 59 for receiving the lower temperature coolant after passage through the core. The outlet tank 59 is connected to a pump inlet line 61, which is in turn connected to the pump 42 for pumping the lower temperature coolant through an engine input line 63 and back into the block coolant chamber 24. As indicated by the arrows in FIG. 4, the coolant in the block coolant chamber 24 flows upwardly through the coolant ports 32 of the head gasket 28, and into the head coolant chamber 31 of the head 26. After passing through the coolant chambers 24 and 31, the hot coolant is discharged through an outlet port 64, which is in turn connected to an engine output line 62 for discharging the hot coolant into the relatively higher pressure inlet tank 55 of the radiator 54. After passage through the heat-exchange core 54, the lower temperature coolant is received within the lower-pressure outlet tank 59, where the lower temperature and lower pressure coolant is received in the pump inlet line 61, and in turn pumped back through the engine coolant chambers. As described in further detail in U.S. Pat. No. 5,031,579, the plurality of coolant ports 32 are preferably progressively staged as shown in order to minimize the effect of the coolant outlet port 64 being located in relative close proximity to the coolant inlet line 63, and to thereby avoid the problem of liquid coolant being unevenly distributed throughout the coolant chambers.

In mounting the cooling system of the present invention to this type of "conventional-flow" engine, the vent port 72 is located within a relatively lower-pressure area of the coolant flow circuit, such as within the upper portion of the outlet tank 59 of the radiator 54, as shown in FIG. 4, in order to couple the expansion reservoir 76 (not shown) in fluid communication with the engine coolant chambers forming a part of the coolant flow circuit. The vent line 74 is connected to the vent port 72, and the reservoir housing 82 (not shown) is connected to the vent line and mounted in the same manner as described above with reference to FIGS. 1 through 3. Alternatively, the vent port 72 may be located within the relatively lower-pressure pump inlet line 61, or within the inlet port of the pump 42. However, the vent port 72 is preferably located within an elevated area of the engine, such as in the upper portion of the radiator outlet tank 54 as shown, in order to ensure that any trapped gases are discharged into the expansion reservoir, as described previously. In addition, because the vent port 72 is connected to the low-pressure side of the cooling system, the coolant will not be forced through the vent port and into the reservoir by action of the pump.

Figure 5:
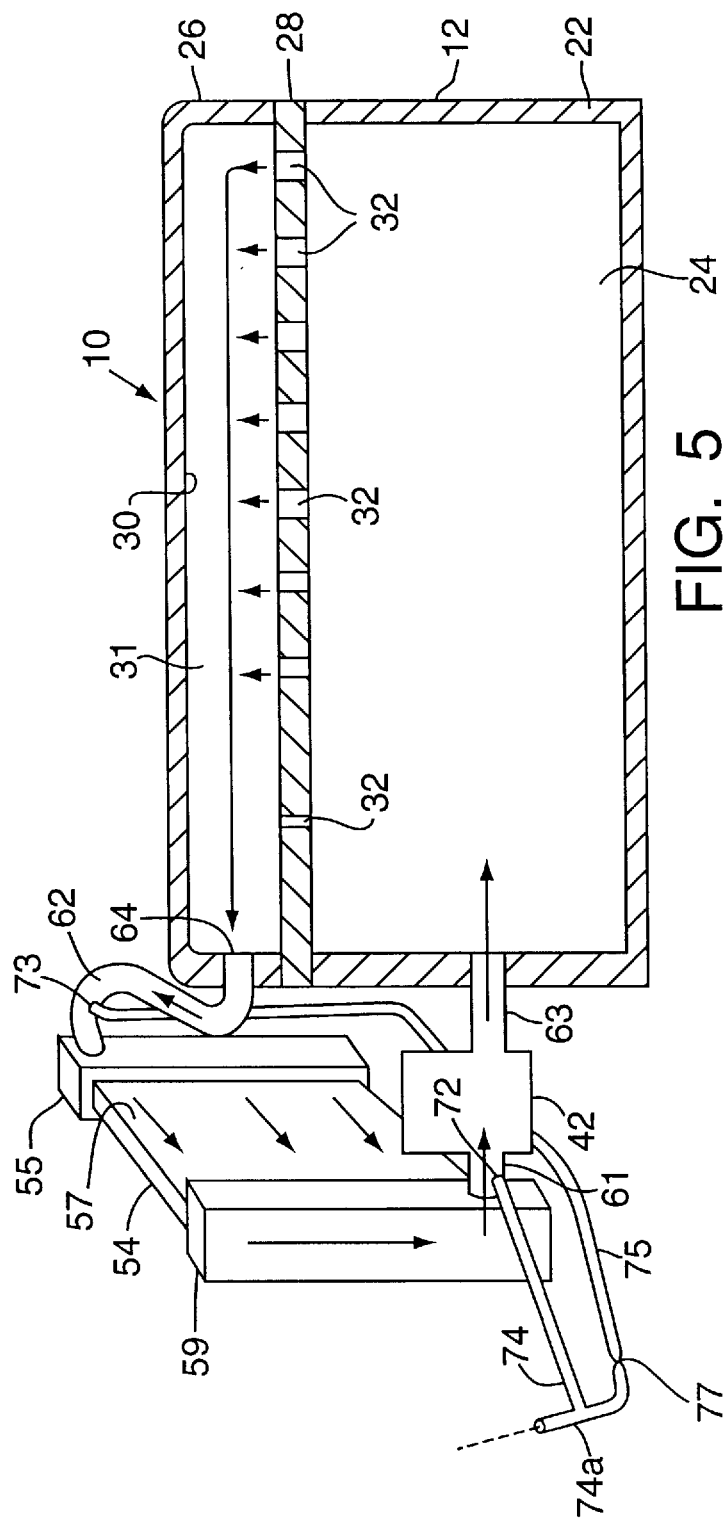
FIG. 5 is a schematic cross-sectional view of another embodiment of a cooling system of the invention configured to pump the coolant in a conventional-flow direction.

Turning to FIG. 5, another engine embodying a cooling system of the present invention is indicated generally by the reference numeral 10. The cooling system of the engine 10 is configured to pump the coolant in the "conventional-flow" direction like the system described above in relation to FIG. 4, and therefore like reference numerals are used to indicate like elements.

A primary difference of the engine 10 of FIG. 5 is that the vent port 72, which couples the expansion reservoir 76 (not shown) in fluid communication with the engine coolant chambers, is connected to the relatively lower-pressure inlet line 61 of the coolant pump 42, and is thus located within a lower region of the coolant flow circuit and engine. Accordingly, in order to de-gas the higher elevations of the radiator 54 and of the coolant chambers 24 and 31, a de-gassing outlet port 73 is connected to the upper hose 62 extending between the head coolant chamber 31 and radiator 54, and a de-gassing line 75 is connected to the de-gassing port 73 to receive non-condensable gases and trace vapors, if any, passing through the upper hose. The other end of the de-gassing line 75 is connected to one leg of a junction tee, and the other two legs of the tee are connected to the vent line 74 and a second vent line 74a, respectively. The second vent line 74a is in turn connected to the reservoir housing 82 (not shown), which may be the same as any of those previously described. Accordingly, this embodiment of the invention includes a de-gassing and vent line assembly comprising the de-gassing line 75, the vent line 74, and the second vent line 74a, which together perform the function of the single vent line of the previously-described embodiments. As indicated schematically in FIG. 5, the de-gassing line 75 includes a flow restriction 77 defining a reduced internal diameter, typically within the range of about 1.6 through 2.4 mm (0.060 through 0.090 inch) for constricting the coolant flow passageway, and thereby establishing a maximum coolant flow rate which is extremely low through the de-gassing and vent lines.

In the operation of the engine 10 of FIG. 5, any entrapped non-condensable gases and trace vapors, if present, which accumulate in the upper elevations of the cooling system, will pass through the vent port 73 and into the de-gassing line 75 with a small volume of liquid coolant. The coolant flow rate through the de-gassing line 75 is established by the flow restrictor 77, and any such coolant flows from the de-gassing line, through the junction tee and vent line 74, and into the inlet line 61 of the pump 42. Although the coolant flowing through the de-gassing line 75 by-passes the radiator 54, the volume of such coolant is extremely small and thus does not have a significant debilitating effect on the cooling performance of the radiator 54 or engine cooling system. The non-condensable gases and trace vapors, if any, will break away from the minor fraction of coolant continually flowing from the degassing line 75 and into the vent line 74, and will in turn pass upwardly through the second vent line 74a and into the reservoir housing. Only liquid coolant, free of any gases, will pass through the vent line 74, pump 42 and back into the engine coolant chambers, thereby exhausting substantially all gases through the reservoir and into the engine's ambient atmosphere.

Although the radiator 54 of FIG. 5 is schematically illustrated as a "cross-flow" radiator, the same vent line assembly may be employed with a "down-flow" radiator. In a down-flow radiator, the higher-pressure inlet tank is located on the top of the radiator, and typically extends horizontally adjacent to the radiator core, and the lower-pressure outlet tank is located at the bottom of the radiator core so that the coolant flows from the inlet tank downwardly through the core and into the outlet tank. In this type of system configured to pump the coolant in a "conventional-flow" direction (as opposed to "reverse-flow"), the vent port 72 is preferably located in one of the following relatively low-pressure locations on the draw side of the pump 42 in order to couple the reservoir 76 in fluid communication with the engine coolant chambers: within the outlet (or bottom) tank of the radiator, within the pump inlet line, or within the inlet port of the pump. In addition, if the system does not include a de-gassing outlet port 73 and de-gassing line 75 as illustrated in FIG. 5, then a purge valve mounted in an upper region of the cooling system, such as the air-bleed valve 70 of FIG. 1, may be used instead to periodically purge and thereby degas the cooling system.

Turning to FIGS. 6A and 6B, another engine embodying a cooling system of the present invention is indicated generally by the reference numeral 10. The primary difference of the engine 10 in comparison to the engines illustrated above, is that the engine 10 is not an internal combustion engine, but rather is another type of engine for generating electrical power which is typically referred to as a "fuel cell". The cooling system of the engine or fuel cell 10 is essentially the same as that described above with reference to FIGS. 1 through 5, and therefore like reference numerals are used to indicate like elements.

The engine of FIGS. 6A and 6B is more specifically identified as a "proton exchange membrane fuel cell", and generates electricity by combining air and any of various hydrogen-enriched fuels, such as liquid hydrogen, methanol, ethanol and petroleum. If liquid hydrogen is used, then the only emission from the engine is typically water. This type of engine is therefore effectively a "gas battery" which is capable of providing approximately the same power density (or equivalent packaging) as a comparable internal combustion engine.

As shown in FIG. 6A, the engine 10 includes a membrane catalyst 126, a negative anode cell 128 mounted on one side of the membrane, and a positive cathode cell 130 mounted on the opposite side of the membrane. An engine coolant chamber 132 surrounds the anode and cathode cells 128 and 130, respectively, and is coupled in fluid communication with the other components of the engine cooling system in the same manner as the engine coolant chambers described above for receiving a liquid coolant to transfer heat away from the heat-rejecting components of the engine. An electric motor 134 is electrically connected between the anode cell 128 and cathode cell 130 for receiving the flow of electrons between the two cells, and to in turn convert the electric current into mechanical force or motion.

In the operation of the fuel cell 10, the hydrogen-enriched fuel is introduced into the negative anode cell 128, and the membrane catalyst 126 functions to permit only the protons of the fuel to flow through the membrane to the positive anode cell 130. The membrane catalyst 126 is configured in a manner known to those skilled in the pertinent art so that it causes the electrons of the fuel to split-off from the protons, and to in turn pass through a separate electric circuit to the cathode. Accordingly, the electron flow is generated by the fuel cell for producing energy for work. In the embodiment of the present invention illustrated, the electric current generated by the fuel cell is used to drive the electric motor 134. As will be recognized by those skilled in the pertinent art, however, the electric current generated by the fuel cell may be used for numerous other purposes.

When the electrons reach the cathode cell 130, the hydrogen molecules react with oxygen in the air and produce water, which is the primary emission of the engine. A significant amount of heat may be generated when the electrons are split off in the anode cell 128, and when the hydrogen molecules react with air to produce water in the cathode cell 130. The coolant may therefore be the same type of substantially anhydrous coolant as described above (preferably propylene glycol), and may be pumped through the coolant chamber 132 in the same manner as the coolant described above in connection with any of the previous embodiments.

Accordingly, the coolant preferably fills the coolant chamber 132, and during the preferred "reverse-flow" operation of the engine cooling system, as indicated schematically in FIG. 6A, the pump 42 draws the hot coolant through the outlet port 38 and conduit 40. The coolant then passes through the heater 68 and/or radiator 54 in the same manner as described above, and in turn passes through the upper conduit 62 and inlet port 64 and into the upper region of the coolant chamber 132. As also indicated in FIGS. 6A and 6B, the vent port 72 is connected to the upper region of the coolant chamber 132, and the expansion reservoir 76 functions in the same manner as described above in connection with FIGS. 1A and 1B. If desired, the expansion reservoir may likewise be configured in accordance with the embodiments of FIGS. 2A and 2B or 3 and would function in the respective manner as previously described.

If, on the other hand, the coolant is pumped in a "conventional-flow" direction, then the vent port 72 vent line 74 of the expansion reservoir may be located and connected to the other components of the cooling system in the same manner as described above in connection with either of FIGS. 4 or 5.

Accordingly, although the expansion reservoir 76 of FIG. 6B is configured in the same manner as described above in connection with the embodiment of FIG. 1B, it may equally be configured in accordance with any of the other above-described embodiments, and may include any of the additional features and operate in essentially the same manner as each of the above-described embodiments.

Turning to FIGS. 7A and 7B, another engine embodying a cooling system of the invention is indicated generally by the reference numeral 10. The engine and cooling system of FIGS. 7A and 7B are substantially the same in many respects to the engines and cooling systems described above, and therefore like reference numerals are used to indicate like elements. The cooling system of FIGS. 7A and 7B differs from those described above in that the expansion reservoir 76 comprises a temperature-controlled, ventilation valve assembly 136 for selectively opening and closing the vent port 84 of the reservoir depending upon the temperature of the coolant within the expansion chamber 80 and/or the temperature of the desorption environment 90.

As shown in FIG. 7B, the valve assembly 136 comprises an electrically-actuated valve 138 mounted within either the vent port 84 or vent line 85 of the reservoir for selectively ventilating and sealing the expansion chamber 80 of the reservoir with respect to the engine's ambient atmosphere. The valve 138 is electrically connected between a valve switch 140 and the vehicle battery or other suitable power source 58. The valve switch 140 is in turn electrically connected to a temperature sensor 142 which may be mounted within the desorption environment 90 for generating signals indicative of the temperature of the environment, or alternatively, may be mounted within or adjacent to the expansion chamber 80 of the reservoir for generating signals indicative of the temperature of the chamber and/or the coolant within the chamber.

The temperature sensor 142 is preferably set to transmit a closure signal to the valve switch 140 when its temperature exceeds a set point corresponding to the predetermined temperature for vaporizing substantially all water from the coolant within the chamber. Thus, if the sensor 142 is mounted within either the expansion chamber 80 or desorption environment 90 (as shown), the set point will be at least approximately 70° F. (21.1° C.), and preferably at least approximately 90° F. (32.2° C.). Accordingly, when the temperature of the sensor 142 reaches the set point, the valve switch 140 is responsive to the signal to close the electrical circuit between the valve and power source 58. The ventilation valve 138 is normally closed, and therefore actuation of the valve switch 140 opens the valve and ventilates the expansion chamber 80 to the engine's ambient atmosphere. Thus, during engine operation, once the temperature of the coolant within the expansion chamber and/or the temperature of the desorption environment reaches the set point of the sensor, the valve opens to permit any water vapor from the coolant to exhaust into the engine's ambient atmosphere. Then, when the engine is shut off, and the system cools down, the temperature of the sensor 142 will drop below the set point. This will in turn cause the valve switch 140 to open, and the ventilation valve 138 to return to its normally closed position to seal the expansion chamber from the engine's ambient atmosphere. Thus, during periods of prolonged engine shut down, the coolant will be sealed from the engine's ambient atmosphere, and therefore will be maintained in a substantially anhydrous state.

In FIG. 8 another expansion reservoir embodying the invention is indicated generally by the reference numeral 76. The expansion reservoir 76 of FIG. 8 is the same in many respects as the expansion reservoir of FIG. 7B, and therefore like reference numerals are used to indicate like elements. The primary difference of the expansion reservoir of FIG. 8 is that it includes a pressure-relief and vacuum-relief valve assembly 144 for relieving either undesirable pressure or vacuum conditions within the expansion chamber 80 when the ventilation valve 138 is closed.

The pressure and vacuum relief valve assembly 144 is formed within the reservoir cap 146 and includes a pressure-relief valve 148 and a vacuum-relief valve 150. The reservoir 76 also includes a ventilation valve assembly 136 comprising a ventilation valve 138 connected to the vent port 84 of the reservoir, along with a temperature sensor 142 (not shown) and valve switch 140 (not shown). In the preferred embodiment, the pressure-relief valve 148 is set to open in response to a relatively slight pressure within the expansion chamber 80 (e.g., about 4 psig), and the vacuum-relief valve 146 is likewise set to open in response to a relatively slight vacuum within the expansion chamber (e.g., about 0.5 mm Hg.).

If the ventilation valve 138 is set to open at the upper end of the preferred predetermined temperature (i.e., greater than about 90° F. (32.2° C.)), then the coolant will thermally-expand and increase the pressure within the expansion chamber prior to the point at which the valve 138 opens and ventilates the chamber to the engine's ambient atmosphere. Accordingly, in this situation, if the pressure within the expansion chamber 80 exceeds the set point of the pressure-relief valve 148 (e.g., about 4 psig), the pressure relief valve will open to exhaust any non-condensable gases and/or vapors within the chamber and thereby maintain the pressure within the expansion chamber at about the predetermined pressure setting of the valve. Then, when the temperature exceeds the set point of the ventilation valve assembly 136, the ventilation valve 138 will open and ventilate the expansion chamber to the engine's ambient atmosphere.

During engine cool down, on the other hand, if the ventilation valve 138 is set to close at the preferred predetermined temperature (e.g., about 90° F. (32.2° C.)), then an undesirable vacuum may develop within the cooling system as the temperature of the coolant approaches ambient and the coolant thermally contracts. In this situation, the vacuum-relief valve 146 will open in order to draw into the expansion chamber 80 a small amount of ambient air to maintain the pressure within the expansion chamber at about the set point of the valve (e.g., about 0.5 mm Hg) and/or to substantially eliminate the vacuum condition.

Accordingly, through the combined functions of the temperature-sensitive valve 138, pressure-relief valve 148 and vacuum-relief valve 150, the reservoir 76 will permit the coolant to "desorb" during engine operation, and after engine shut-down, the system will be sealed from the ambient atmosphere to thereby prevent the coolant from hygroscopically absorbing water. This may be a particular concern in installations where the engine or vehicle will be subjected to extended periods of down time under relatively high ambient humidity and/or critical vapor pressure temperatures.

As may be recognized by those skilled in the pertinent art, although the pressure-relief valve 148 and vacuum-relief valve 150 are shown installed in the reservoir cap 146, each such valve may equally be installed at another location on the reservoir above the hot coolant level "C". In addition, the relief valves are preferably each of a type which is relatively easy to manufacture and/or inexpensive to produce, such as, but not limited to, a spring and poppet, reed or like valve configuration.

As will be recognized by those skilled in the pertinent art, numerous modifications may be made to the above-described and other embodiments of the present invention, without departing from its scope as defined in the appended claims. Accordingly, this detailed description of preferred embodiments is to be taken in an illustrative, as opposed to a limiting sense.

I claim:

1. An engine cooling system, comprising:
   at least one engine coolant chamber formed adjacent to heat-emitting components of the engine;
   a substantially anhydrous, boilable liquid coolant having a saturation temperature higher than that of water and received within the at least one engine coolant chamber;
   first means coupled in fluid communication between the at least one engine coolant chamber and the engine's ambient atmosphere for receiving coolant from the at least one engine coolant chamber and permitting coolant flow between the first means and the at least one engine coolant chamber with thermal expansion and contraction of the coolant; and
   second means for heating coolant within the first means to a temperature at or above a predetermined temperature during engine operation for vaporizing substantially all water from the coolant and thereby maintaining the coolant in a substantially anhydrous state.

2. An engine cooling system as defined in claim 1, wherein the predetermined temperature of the second means is selected to maintain the water content of the coolant at a level of less than approximately 5% water by weight during a substantial period of engine operation.

3. An engine cooling system as defined in claim 2, wherein the predetermined temperature of the second means is at least approximately 70° F. (21.1° C.).

4. An engine cooling system as defined in claim 1, wherein the second means maintains the coolant therein at a temperature at or above the predetermined temperature during at least 50% of each period of engine operation on average.

5. An engine cooling system as defined in claim 1, wherein the engine includes a radiator defining an inlet side for receiving relatively cool air and an exhaust side for discharging relatively warm air, and the second means is located within a desorption region on the exhaust side of the radiator for heating the coolant therein with the relatively warm air on the exhaust side of the radiator to a temperature at or above the predetermined temperature during a substantial period of engine operation.

6. An engine cooling system as defined in claim 5, wherein the engine is mounted within a structure comprising an engine bay, and the engine is mounted within the bay and forms a space between the engine and at least one side wall of the bay defining the desorption region.

7. An engine cooling system as defined in claim 6, wherein the structure further includes an upper region wall extending over and covering the engine and engine bay, and the desorption region is formed in an upper region of the bay with the second means located in close proximity to the upper wall.

8. An engine cooling system as defined in claim 1, wherein the second means includes at least one coolant expansion chamber located within a predetermined region adjacent to one or more heat-emitting components of the engine for heating the coolant therein to a temperature at or above the predetermined temperature during a substantial period of engine operation.

9. An engine cooling system as defined in claim 1, wherein the second means includes at least one heating element located within or adjacent to the coolant received therein for heating the coolant within the second means to a temperature at or above the predetermined temperature.

10. An engine cooling system as defined in claim 9, wherein the at least one heating element is connected to an electrical power source for receiving electric current through the at least one heating element, and in turn transferring heat generated by the current to the coolant in the expansion chamber.

11. An engine cooling system as defined in claim 10, further comprising means for generating signals indicative of the temperature of coolant in the first means, and wherein the at least one heating element is responsive to the signals to heat the coolant in the first means to a temperature at or above the predetermined temperature.

12. An engine cooling system as defined in claim 10, wherein the engine comprises an ignition switch for starting and stopping the engine, and the at least one heating element is electrically coupled to the ignition switch and responsive to actuation of the switch to actuate the heating element and thereby heat the coolant in the first means during engine operation.

13. An engine cooling system as defined in claim 9, wherein the at least one heating element defines a coolant passageway coupled in fluid communication with a discharge port of the at least one engine coolant chamber for receiving through the heating element relatively hot coolant discharged by the engine coolant chamber and turn heating the coolant in the first means therewith.

14. An engine cooling system as defined in claim 1, wherein the first means includes an expansion chamber for receiving coolant from the at least one engine coolant chamber, and a valve coupled in fluid communication between the at least one engine coolant chamber and the engine's ambient atmosphere for controlling ventilation of at least one of the engine coolant chamber and expansion chamber to the engine's ambient atmosphere.

15. An engine cooling system as defined in claim 14, wherein the valve is coupled in fluid communication between the expansion chamber and the engine's ambient atmosphere; the system further comprises means for generating signals indicative of the temperature of coolant in the expansion chamber; and the valve is responsive to the signals to ventilate the expansion chamber when the coolant temperature exceeds a predetermined value.

16. An engine cooling system as defined in claim 14, wherein the valve is a pressure-relief valve and is responsive to the pressure in at least one of the engine coolant chamber and expansion chamber exceeding a predetermined value to ventilate the respective chamber to the engine's ambient atmosphere.

17. An engine cooling system as defined in claim 14, wherein the valve is a vacuum-relief valve and is responsive to the pressure in at least one of the engine coolant chamber and expansion chamber falling below a predetermined value to ventilate the respective chamber to the engine's ambient atmosphere.

18. A method of cooling an engine having at least one engine coolant chamber formed adjacent to heat-emitting components of the engine, comprising the steps of:

pumping a substantially anhydrous, boilable liquid coolant having a saturation temperature higher than that of water and distributing the pumped coolant through the at least one engine coolant chamber;

directing coolant from the at least one engine coolant chamber into an expansion chamber and permitting coolant flow between the engine coolant chamber and expansion chamber;

heating the coolant within the expansion chamber to a temperature at or above a predetermined temperature and in turn vaporizing substantially all water from the coolant; and ventilating the expansion chamber to exhaust vapor therefrom and maintain the coolant in a substantially anhydrous state.

19. A method of cooling an engine as defined in claim 18, comprising the step of maintaining the coolant in the expansion chamber at or above the predetermined temperature during at least 50% of the total periods of engine operation.

20. A method of cooling an engine as defined in claim 18, comprising the steps of (i) ventilating the expansion chamber to the engine's ambient atmosphere during engine operation, and (ii) sealing the expansion chamber from the engine's ambient atmosphere when the engine is turned off to prevent the coolant from absorbing water when the engine is turned off.

21. A method of cooling an engine as defined in claim 18, comprising the step of heating the coolant within the expansion chamber to a temperature at or above a predetermined temperature selected to maintain the water content of the coolant at a level of less than approximately 5% water by weight during a substantial period of engine operation.

22. A method of cooling an engine as defined in claim 21, wherein the predetermined temperature is at least approximately 70° F. (21.1° C.).

23. A method of cooling an engine as defined in claim 21, wherein the predetermined temperature is approximately 90° F. (32.2° C.), and the water content of the coolant is maintained at a level of less than approximately 3% water by weight during a substantial period of engine operation.

24. A method of cooling an engine as defined in claim 18, wherein the engine is mounted within a structure comprising an engine bay, and the engine is mounted within the bay and forms a space between the engine and at least one side wall of the bay forming a desorption region, and further comprising the step of mounting the expansion chamber within an upper portion of the desorption region for heating the coolant within the expansion chamber to a temperature at or above the predetermined temperature.

25. A method of cooling an engine as defined in claim 18, further comprising the steps of mounting a heating circuit within or adjacent to the expansion chamber, and heating the coolant within the expansion chamber with the heating circuit to a temperature at or above the predetermined temperature.

26. A method of cooling an engine as defined in claim 25, further comprising the step of measuring the temperature within or adjacent to the expansion chamber, and actuating the heating circuit when the measured temperature falls below the predetermined temperature.

27. A method of cooling an engine as defined in claim 25, further comprising the step of directing relatively hot coolant discharged by the at least one engine coolant chamber through the heating circuit and heating the coolant in the expansion chamber therewith.

28. A method of cooling an engine as defined in claim 18, further comprising the steps of (i) ventilating at least one of the engine coolant chamber and the expansion chamber to the engine's ambient atmosphere in response to the pressure in the respective chamber exceeding a first predetermined pressure value, and (ii) sealing at least one of the engine coolant chamber and expansion chamber from the engine's ambient atmosphere in response to the pressure in the respective chamber falling below the first predetermined value.

29. A method of cooling an engine as defined in claim 28, further comprising the step of ventilating at least one of the engine coolant chamber and expansion chamber to the engine's ambient atmosphere in response to the pressure in the respective chamber falling below a second predetermined pressure value to thereby substantially prevent the formation of a vacuum in the respective chamber.

30. A method of cooling an engine as defined in claim 18, further comprising the step of heating the coolant within the expansion chamber during at least of (i) a predetermined period immediately prior to engine operation, and (ii) a predetermined period immediately following termination of engine operation.

\* \* \* \* \*